(12) United States Patent
Dugad et al.

(10) Patent No.: US 6,807,310 B1
(45) Date of Patent: Oct. 19, 2004

(54) TRANSFORMATION OF IMAGE PARTS IN DIFFERENT DOMAINS TO OBTAIN RESULTANT IMAGE SIZE DIFFERENT FROM INITIAL IMAGE SIZE

(75) Inventors: Rakesh Champalal Dugad, Champaign, IL (US); Narendra Ahuja, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 09/576,678

(22) Filed: May 23, 2000

(51) Int. Cl.[7] .............................. G06K 9/36; G06K 9/32; G06F 17/14

(52) U.S. Cl. ........................ 382/248; 382/235; 382/298; 708/402

(58) Field of Search .................................. 382/248, 235, 382/232, 233, 246, 250, 240, 298, 260; 375/240.11, 240.2, 240.12, 240.26; 708/402, 603

(56) References Cited

U.S. PATENT DOCUMENTS

| | | | | |
|---|---|---|---|---|
| 5,708,732 A | * | 1/1998 | Merhav et al. | 382/232 |
| 5,764,807 A | * | 6/1998 | Pearlman et al. | 382/240 |
| 5,870,144 A | * | 2/1999 | Guerrera | 375/240.2 |
| 5,875,039 A | * | 2/1999 | Ohsawa et al. | 382/248 |
| 6,111,989 A | * | 8/2000 | Chang et al. | 382/250 |
| 6,115,070 A | * | 9/2000 | Song et al. | 375/240.12 |
| 6,456,745 B1 | * | 9/2002 | Bruton et al. | 382/298 |
| 6,526,099 B1 | * | 2/2003 | Christopoulos et al. | 375/240.26 |
| 6,587,590 B1 | * | 7/2003 | Pan | 382/250 |

OTHER PUBLICATIONS

Chang and Messerschmitt, "Manipulation and Compositing of MC-DCT Compressed Video," in IEEE Journal on Selected Areas in Communications, vol. 13, No. 1., Jan. 1995, pp. 1–11.

Natarajan and Vasudev,"A Fast Approximate Algorithm for Scaling Down Digital images in the DCT Domain," Hewlett-Packard Laboratories, Palo Alto, California, 1995, pp. 241–243.

Hu and Panchanathan, "Image/Video Spatial Scalability in Compressed Domain," in IEEE Transactions On Industrial Electronics, vol. 45, No. 1., Feb. 1998, pp. 23–31.

Merhav and Bhaskaran, "Fast Algorithms for DCT-Domain Image Down-Sampling and for Inverse Motion Compensation," in IEEE Transactions On Circuits and Systems for Video Technology, vol. 7, No. 3., Jun. 1997, pp. 468–476.

Smith and Rowe, "Algorithms for Manipulating Compressed Images," in IEEE Computer Graphics & Applications, Sep. 1993, pp. 34–42.

* cited by examiner

*Primary Examiner*—Wenpeng Chen
(74) *Attorney, Agent, or Firm*—Gary R. Gillen; Wildman, Harrold, Allen & Dixon LLP

(57) ABSTRACT

In one example, a transform component of a system receives a first plurality of image parts in a first domain that comprise an initial size. A transform component of the system transforms the first plurality of image parts to obtain a second plurality of image parts in a second domain different from the first domain. A transform component of the system transforms a plurality of image parts based on the second plurality of image parts to obtain a resultant plurality of image parts in the first domain that comprise a resultant size different from the initial size. In a further example, a transform component of a system applies sparse matrix multiplication to each of first and second image parts.

39 Claims, 12 Drawing Sheets

US 6,807,310 B1

TRANSFORMATION OF IMAGE PARTS IN DIFFERENT DOMAINS TO OBTAIN RESULTANT IMAGE SIZE DIFFERENT FROM INITIAL IMAGE SIZE

This invention was made with Government support under Contract Number ONR: N00014-96-1-0502 UFAS No. 1-5-20764 awarded by Office of Naval Research. The Government may have certain rights in the invention.

TECHNICAL FIELD

This invention relates generally to image processing and more particularly to changing size of an image in a compressed domain.

BACKGROUND OF THE INVENTION

A typical system stores data such as multimedia content for video, in a compressed digital format. To perform processing on this data, the typical system usually must uncompress the data, process the data, and then recompress the data. One shortcoming of such a system is the relatively high expenditure of time required for uncompressing and recompressing the data to allow performance of the data processing.

Thus, a need exists for enhanced processing of data that is stored by a system in a compressed format.

SUMMARY OF THE INVENTION

Pursuant to the present invention, shortcomings of the existing art are overcome and additional advantages are provided through the provision of transformation of image parts in different domains to obtain a resultant image size different from an initial image size.

The invention in one embodiment encompasses a method. A first plurality of image parts in a first domain that comprise an initial size, is received. The first plurality of image parts is transformed to obtain a second plurality of image parts in a second domain different from the first domain. A plurality of image parts based on the second plurality of image parts is transformed to obtain a resultant plurality of image parts in the first domain that comprise a resultant size different from the initial size.

Another embodiment of the invention encompasses a system. The system includes a transform component that receives a first plurality of image parts in a first domain that comprise an initial size. The system includes a transform component that transforms the first plurality of image parts to obtain a second plurality of image parts in a second domain different from the first domain. The system includes a transform component that transforms a plurality of image parts based on the second plurality of image parts to obtain a resultant plurality of image parts in the first domain that comprise a resultant size different from the initial size.

A further embodiment of the invention encompasses an article. The article includes a computer-readable signal-bearing medium. The article includes means in the medium for receiving a first plurality of image parts in a first domain that comprise an initial size. The article includes means in the medium for transforming the first plurality of image parts to obtain a second plurality of image parts in a second domain different from the first domain. The article includes means in the medium for transforming a plurality of image parts based on the second plurality of image parts to obtain a resultant plurality of image parts in the first domain that comprise a resultant size different from the initial size.

An additional embodiment of the invention encompasses a method. First and second image parts are received. Sparse matrix multiplication is applied to each of the first and second image parts.

Yet another embodiment of the invention encompasses a system. The system includes a transform component that receives first and second image parts. The system includes a transform component that applies sparse matrix multiplication to each of the first and second image parts.

A still further embodiment of the invention encompasses an article. The article includes a computer-readable signal-bearing medium. The article includes means in the medium for receiving first and second image parts. The article includes means in the medium for applying sparse matrix multiplication to each of the first and second image parts.

DETAILED DESCRIPTION

In accordance with the principles of the present invention, a first plurality of image parts in a first domain that comprise an initial size is transformed to obtain a second plurality of image parts in a second domain different from the first domain, and a plurality of image parts based on the second plurality of image parts is transformed to obtain a resultant plurality of image parts in the first domain that comprise a resultant size different from the initial size. For example, sparse matrix multiplication is applied to each of first and second image parts.

A detailed discussion of one exemplary embodiment of the invention is presented herein, for illustrative purposes.

Figure 1:
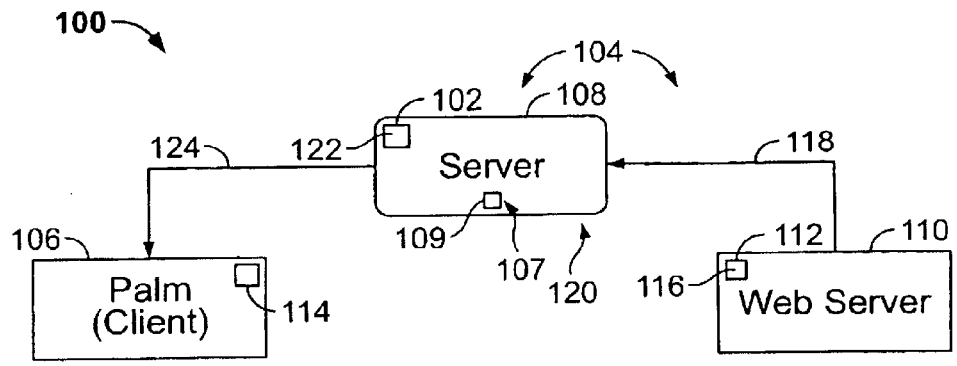
FIG. 1 is a functional block diagram of one example of a system that includes a device in communication with a number of servers that include a transform component.

Turning to FIG. 1, system 100, in one example, includes a plurality of components such as computer software and/or hardware components. For instance, a number of such components can be combined or divided. System 100 in one example employs at least one computer-readable signal-bearing medium; One example of a computer-readable signal-bearing medium for system 100 comprises a recordable data storage medium 102 such as a magnetic, optical, biological, and/or atomic data storage medium. In another example, a computer-readable signal-bearing medium for system 100 comprises a modulated carrier signal transmitted over a network comprising or coupled with system 100, for instance, a telephone network, a local area network ("LAN"), the Internet, and/or a wireless network. An exemplary component of system 100 employs and/or comprises a series of computer instructions written in or implemented with any of a number of programming languages, as will be appreciated by those skilled in the art.

Referring to FIG. 1, one example of system 100 includes a number of servers 104 coupled with a client such as device 106. For instance, servers 104 include a number of transform components 107 such as transform component 109. Servers 104 in one example comprise servers 108 and 110. Server 110 in one example comprises a Web server. For instance, device 106 includes display 114. Device 106 in one example comprises a Palm™ handheld computing device offered by Palm, Inc. (Corporate Headquarters 5470 Great America Parkway, Santa Clara, Calif., U.S.A. 95052; In one example, server 110 stores Web page 112 that is to be displayed on display 114 of device 106.

Again referring to FIG. 1, Web page 112 in one example comprises data 116 such as multimedia data that includes images and/or video in a compressed format. One example of a compressed format for data 116 includes a standard of the Joint Photographic Experts Group ("JPEG") for images. Another example of a compressed format for data 116 includes a standard of the Moving Pictures Expert Group ("MPEG") such as MPEG-1 or MPEG-2 for digital video. A further example of a compressed format for data 116 includes H.263.

In one example, data 116 is unsuitable for direct display on display 114 of device 106, for instance, because data 116 is too large in size and/or device 106 is too limited in bandwidth. In one example in which data 116 is unsuitable for direct display on display 114 of device 106, server 108 advantageously provides data 122 as a differently-sized version of data 116 that is suitable for display on display 114 of device 106, as described herein.

Referring further to FIG. 1, server 108 in STEP 118 fetches data 116 in a compressed format on server 110. Server 108, for instance, employs transform component 109 in STEP 120 to convert data 116 to data 122 in a compressed format and with a size suitable for display on display 114 of device 106. For instance, data 116 comprises one size of an image, and data 122 comprises a different size of the image, as described herein. At STEP 124 in one example, server 108 communicates data 122 to device 106, for display of data 122 on display 114 of device 106.

Still referring to FIG. 1, server 108 and server 110, in one example, comprise a same server. In a further example, server 108 and server 110 comprise separate servers. In another example, server 108 resides on server 110.

Figure 2:
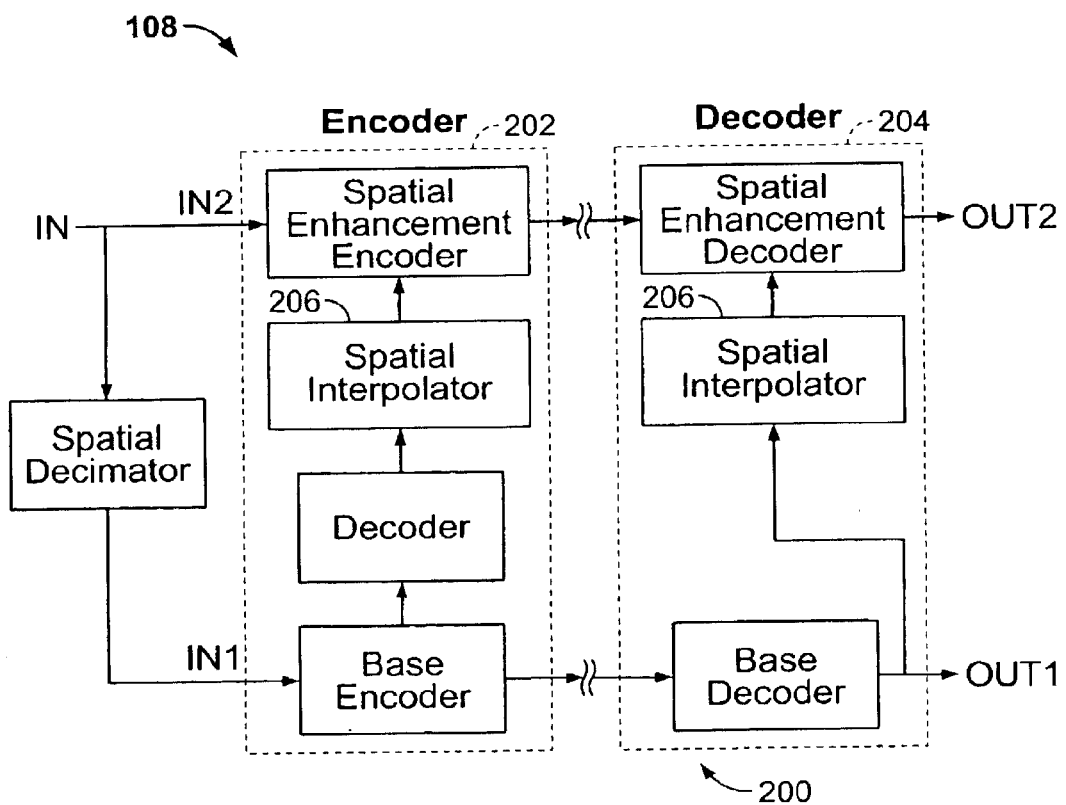
FIG. 2 is, a functional block diagram of one example of an encoder and a decoder employed by an exemplary server that includes one example of the transform component of the system of FIG. 1.

Turning to FIG. 2, server 108 in one example comprises encoder 202 and decoder 204. In one example, server 108 employs a spatially-scalable mode of a standard of the Moving Pictures Expert Group ("MPEG") such as the MPEG-2 video compression standard. Encoder 202 and/or decoder 204 in one example includes spatial interpolator 206. For instance, system 200 comprises encoder 202 and decoder 204. In one example, system 200 employs a spatially-scalable mode of a standard of the Moving Pictures Expert Group ("MPEG") such as the MPEG-2 video compression standard.

Figure 3:
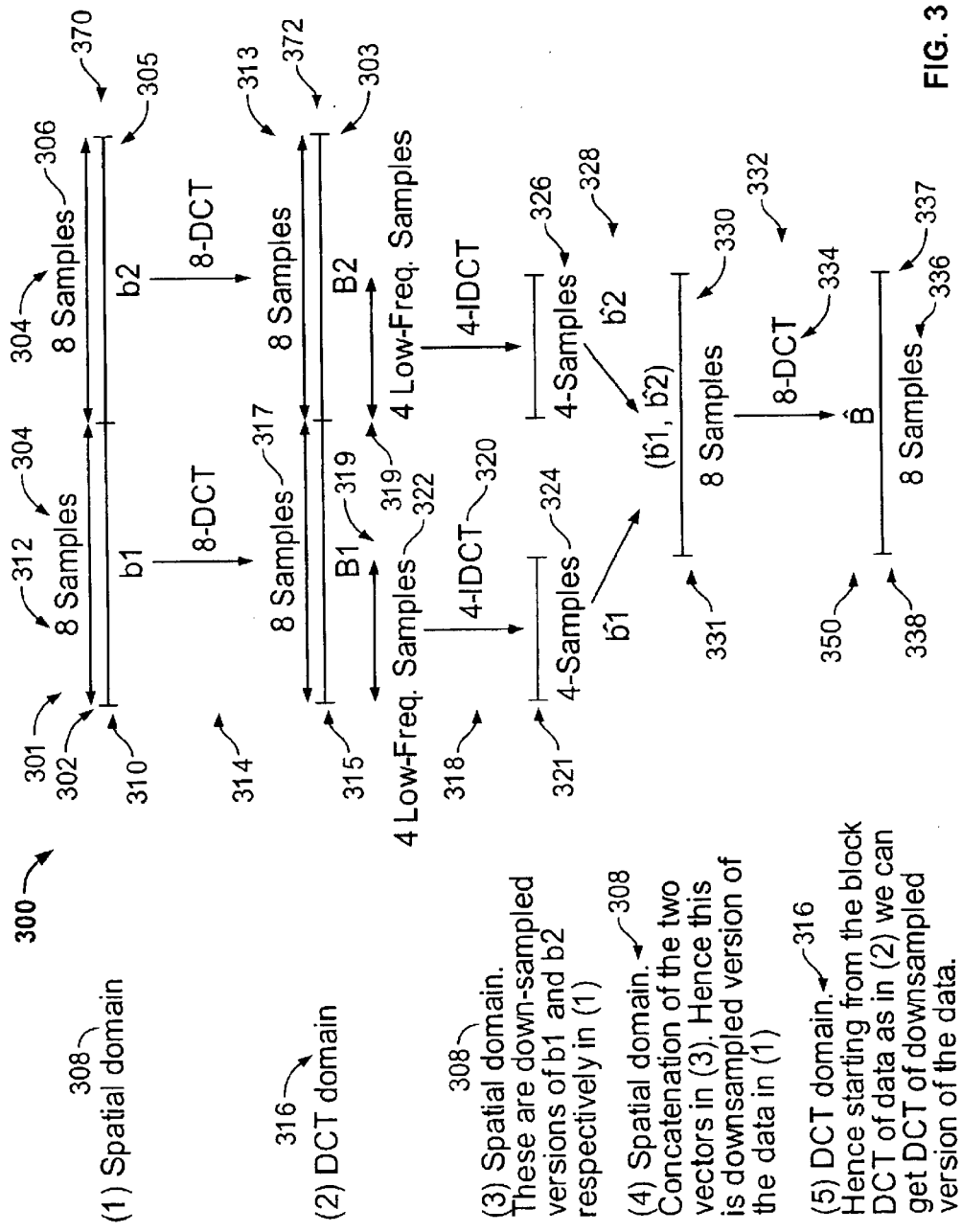
FIG. 3 depicts exemplary logic that is employed by one example of the transform component of the system of FIG. 1, for decreasing the size of a one-dimensional image by a preselected factor.

Now referring to FIGS. 2–3, spatial interpolator 206, for instance, employs exemplary logic 300 to change image 303 to a differently-size image 350. For example, logic 300 serves to change size 313 of image 315 to size 337 of image 338, as described herein. In a further example, spatial interpolator 206 comprises transform component 109 (FIG. 1).

Spatial interpolator 206 of server 108 in FIG. 2, in one example, employs an upsizing scheme. Server 108 of FIG. 1, in another example, employs a downsizing scheme. For instance, referring to FIGS. 2, 7, and 11, spatial interpolator 206 employs exemplary logic 300 to change size 708 of image 706 to size 704 of image 702, or to change size 1108 of image 1106 to size 1104 of image 1102, as described herein.

Figure 7:
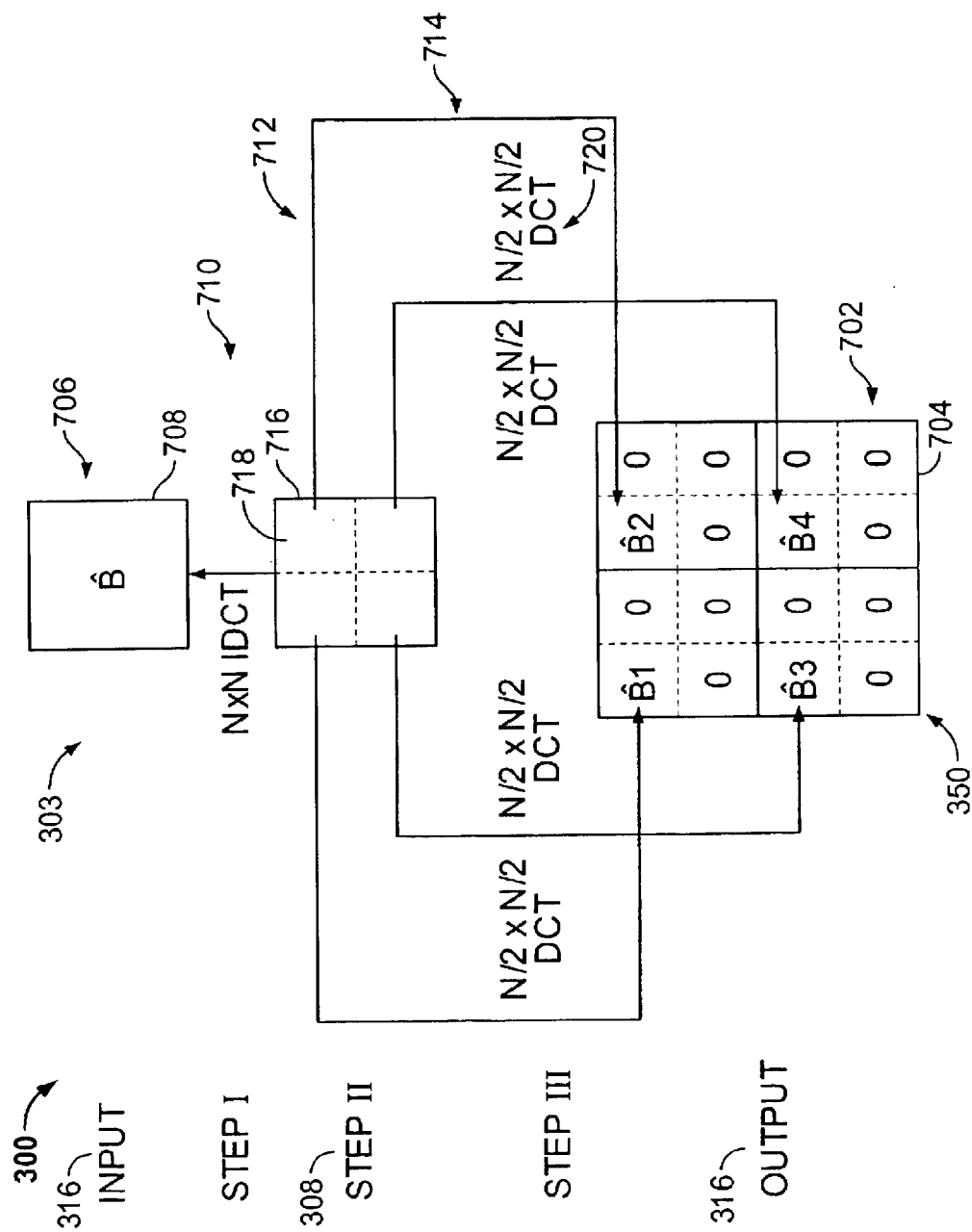
FIG. 7 depicts exemplary logic that is employed by one example of the transform component of the system of FIG. 1, for increasing the size of a two-dimensional image by a preselected factor.
Figure 11:
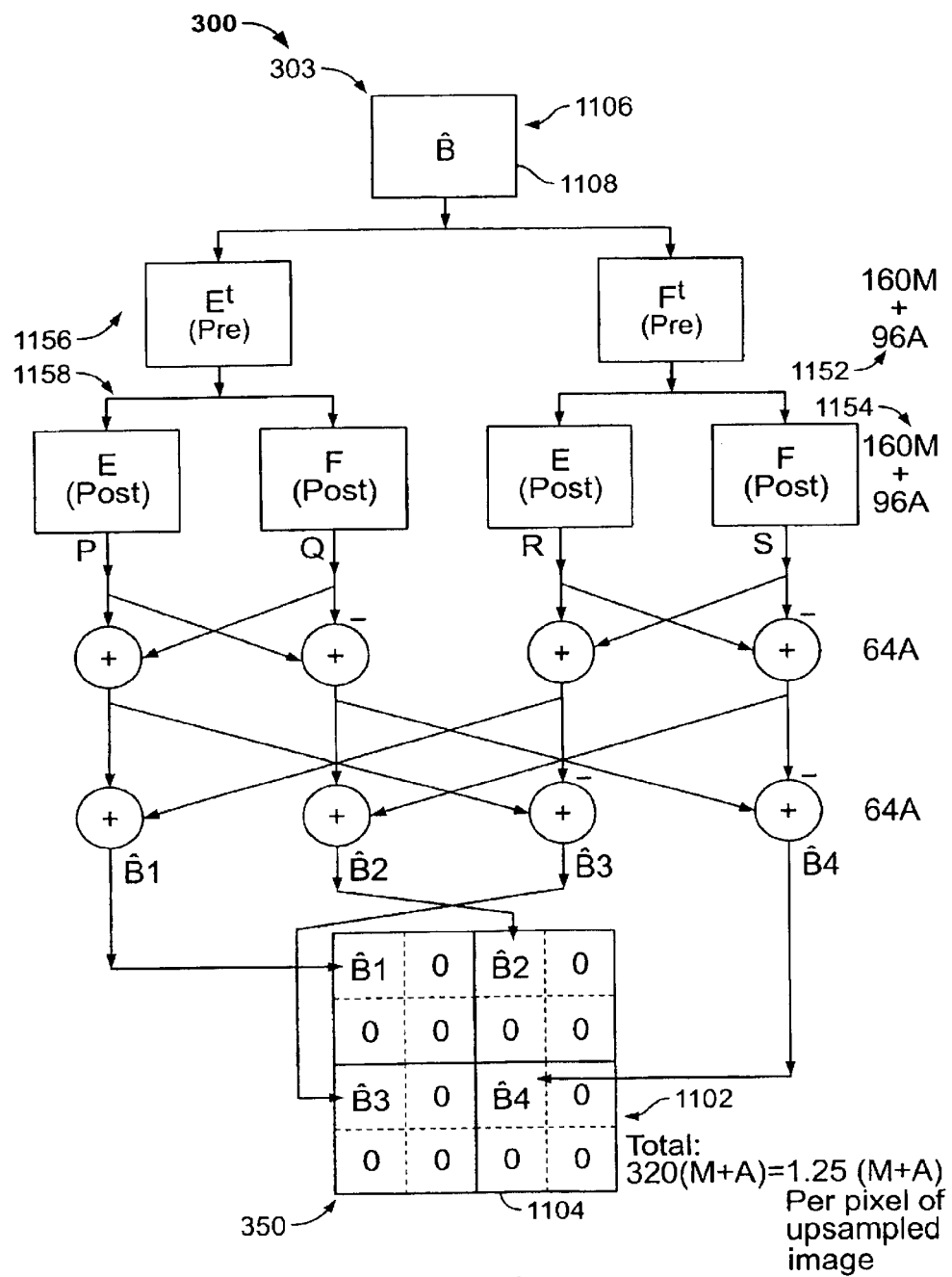
FIG. 11 depicts exemplary logic that is employed by one example of the transform component of the system of FIG. 1, for increasing the size of a two-dimensional image through employment of sparse matrix multiplication.

Referring to FIGS. 2, 7, and 11, in one example encoder 202 employs changed-size image 350 and a motion-compensated previously-coded frame, to obtain an estimation of the original (e.g., larger) image. In one example, employment of logic 300 in spatial interpolator 206 advantageously increases the Peak Signal-to-Noise-Ratio ("PSNR"). In a further example; employment of logic 300 serves to advantageously improve estimation of the original image. In another example, employment of logic 300 in 206 advantageously obviates the previous need to use the motion-compensated previously-coded frame for prediction in coding the enhancement layer, with desirably little or no loss in quality, for instance, while advantageously avoiding a certain complexity otherwise associated with implementation of motion compensation in hardware for encoder 202.

Referring now to FIGS. 1–3, transform component 109 in one example of server 108 employs changed-size image 321 and a motion-compensated previously-coded frame, to obtain an estimation 331 of the original image 315. In one example, employment of logic 300 in spatial interpolator 206 advantageously increases the Peak Signal-to-Noise-Ratio ("PSNR"). In a further example, transform component 109 serves to advantageously improve estimation of the original image. In another example, transform component 109 advantageously obviates the previous need to use the motion-compensated previously-coded frame for prediction in coding the enhancement layer, with desirably little or no loss in quality, for instance, while advantageously avoiding a certain complexity otherwise associated with implementation of motion compensation in hardware for encoder 202.

Referring to FIG. 3, logic 300 in one example accesses image 301 such as one-dimensional image 302. One-dimensional image 302, for instance, comprises a concatenation 305 of a plurality of sets 304 of samples 306. For instance, sets 304 of samples 306 comprise one or more preselected numbers 312 of samples 306. An exemplary instance of preselected numbers 312 of samples 306 comprises eight samples 306. Samples 306 are located in domain 308. Domain 308 in one example comprises a spatial domain.

Again referring to FIG. 3, logic 300 in one example employs STEP 310 to receive samples 306. Logic 300 employs STEP 314 to transform samples 306 from domain 308 to domain 316. Domain 316 is different from domain 308. Examples of a transform that logic 300 employs include a discrete cosine transform ("DCT"), a discrete sine transform, a Fourier transform, and a Hadamard transform.

Referring still to FIG. 3, in one example, one of domains 308 and 316 comprises a transform domain such as a discrete cosine transform ("DCT") domain, a discrete sine transform domain, a Fourier transform domain, or a Hadamard transform domain, and the other of domains 308 and 316 comprises a spatial domain, as will be understood by those skilled in the art.

Referring again to FIG. 3, logic 300 employs STEP 318 to perform, for instance, an inverse transform. STEP 318 in one example applies an inverse (e.g., four) point discrete cosine transform 320 in domain 316 to sets 319 of (e.g., four) low-frequency coefficients 322 of samples 317 obtained in STEP 314. For instance, STEP 318 yields sets 326 of (e.g., four) samples 324 in domain 308. In one example, low-frequency coefficients 322 comprise coefficients that correspond to k=0 through 3 in exemplary Equation (1.2), described further below.

Further referring to FIG. 3, logic 300, in one example, employs STEP 328 in domain 308 to concatenate sets 326 of samples 324 obtained in STEP 318. STEP 328 in one example yields samples 330 in domain 308. STEP 332 applies transform 334 to samples 330, to obtain samples 336 in domain 316. In one example, logic 300 serves to advantageously decrease size 313 of image 315 to size 337 of image 338, for instance, by causing size 337 of image 338 and size 313 of image 315 to comprise a ratio therebetween of two.

Figure 12:
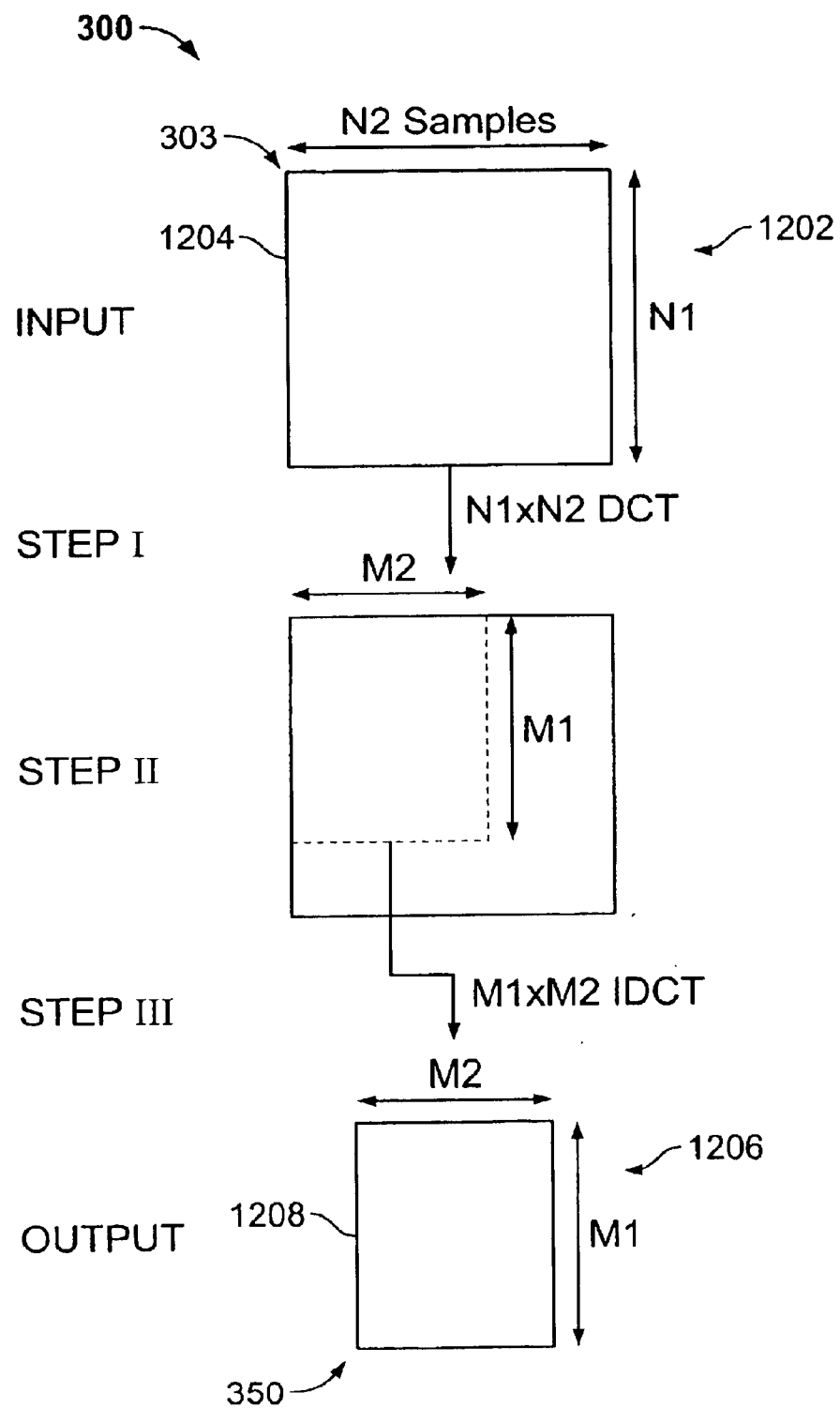
FIG. 12 depicts exemplary logic that is employed by one example of the transform component of the system of FIG. 1, for decreasing the size of an image through employment of a plurality of preselected variables of a factor.
Figure 13:
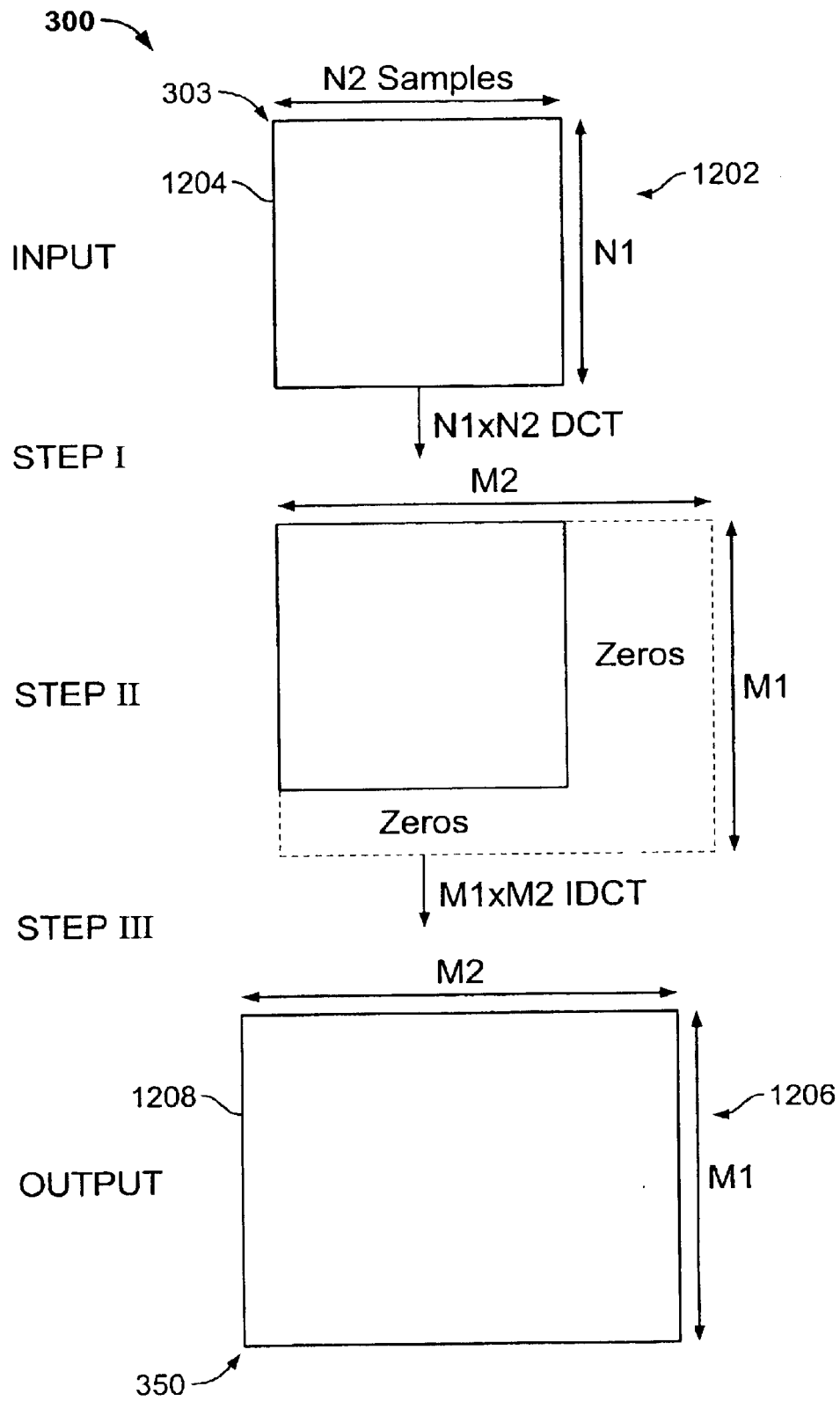
FIG. 13 depicts exemplary logic that is employed by one example of the transform component of the system of FIG. 1, for increasing the size of an image through employment of a plurality of preselected variables of a factor.

Those skilled in the art, from review of the discussion above of employment of logic 300 of FIG. 3 for exemplary decreasing size of a one-dimensional image and the remaining discussion herein taken in conjunction with FIGS. 3–13, will appreciate embodiments such as employment of logic 300 of any of FIGS. 4–5, 8–9, and 12 for exemplary decreasing of size of an image, employment of logic 300 of any of FIGS. 6–7, 10–11, and 13 for exemplary increasing of size of an image, employment of logic 300 of any of FIGS. 5, 7, 9, and 11–13 for exemplary changing of size of a two-dimensional image, employment of logic 300 of FIG. 12 for exemplary decreasing of size of an image by a non-integer factor and/or a factor other than a power of two, and employment of logic 300 of FIG. 13 for exemplary increasing of size of an image by a non-integer factor and/or a factor other than a power of two.

Figure 4:
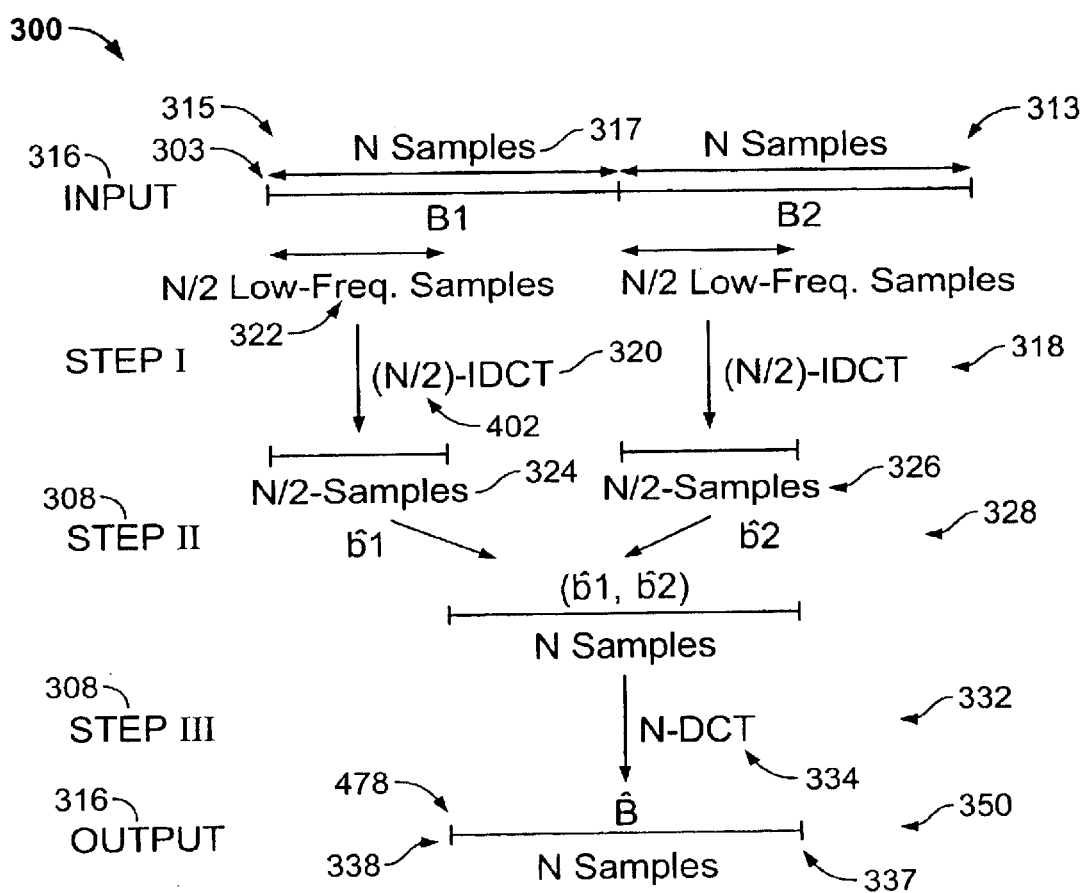
FIG. 4 depicts exemplary logic that is employed by one example of the transform component of the system of FIG. 1, for decreasing the size of a one-dimensional image by a preselected factor.

Turning to FIG. 4, logic 300 serves to decrease size 313 of image 315 by a preselected factor 402, for instance, a factor of two. For instance, INPUT in FIG. 4 comprises receipt of image 303 in (e.g., transform) domain 316. STEP 328 of logic 300 of FIG. 4 in one example employs a scaling factor of $1/\sqrt{2}$ through incorporation of the scaling factor of $1/\sqrt{2}$ in inverse transform 320 of STEP 318, as will be appreciated by those skilled in the art.

Figure 5:
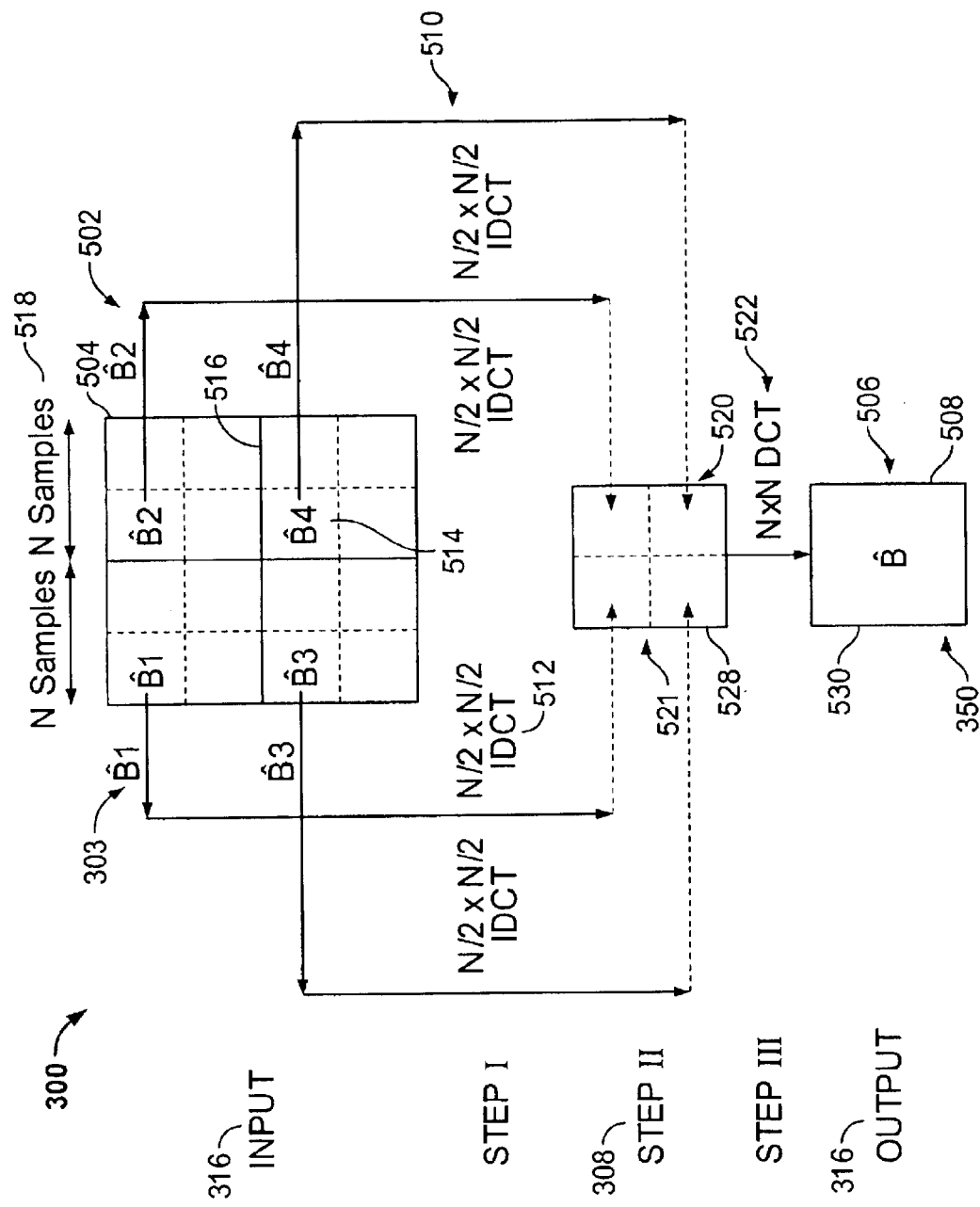
FIG. 5 depicts exemplary logic that is employed by one example of the transform component of the system of FIG. 1, for decreasing the size of a two-dimensional image by a preselected factor.

Turning to FIG. 5, logic 300 decreases size 502 of image 504 in obtaining size 506 of image 508. Logic 300 in one example obtains a preselected ratio of size 506 of image 508 relative to size 502 of image 504. For instance, the ratio between size 506 and size 502 comprises a factor of two.

Still referring to FIG. 5, logic 300 employs STEP 510. STEP 510 in one example comprises applying an N/2×N/2 inverse transform 512 to N/2×N/2 low-frequency sub-blocks 514 of each N×N block 516. N×N blocks 516 represent samples 518. In one example, low-frequency sub-block 514 comprises an N/2×N/2 sub-block of N×N block 516, for instance, that comprises transform coefficients in domain 316. STEP 510 in one example performs an inverse transform from domain 316 to domain 308. For instance, STEP 510 yields N/2×N/2 blocks 520 in domain 308. STEP 522 serves to transform blocks 520 to image 508 in domain 316 through employment of an N×N transform.

Figure 6:
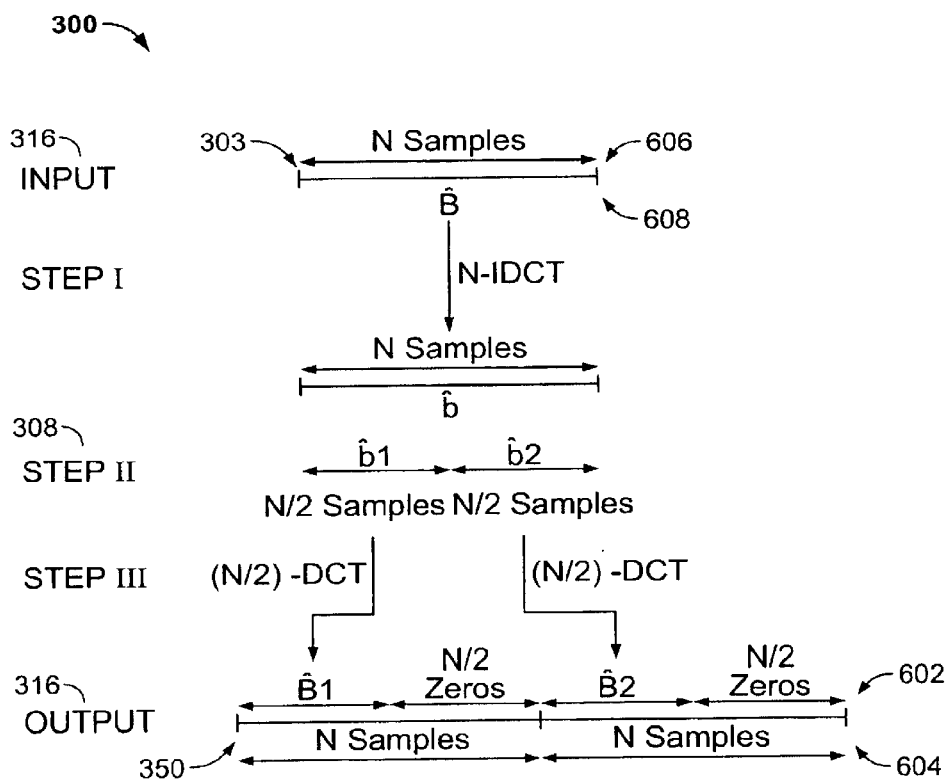
FIG. 6 depicts exemplary logic that is employed by one example of the transform component of the system of FIG. 1, for increasing the size of a one-dimensional image by a preselected factor.

Turning to FIG. 6, logic 300 serves to obtain size 602 of image 604 that is increased relative to size 606 of image 608. Logic 300 in one example operates on image 608 that comprises a one-dimensional image.

Turning to FIG. 7, logic 300 in one example yields size 702 of two-dimensional image 704 that is increased relative to size 706 of two-dimensional image 708. STEPS 710, 712, and 714 cause the increased size 702 directly in domain 316. For instance, domain 316 comprises a transform domain. STEP 710 in one example comprises applying an inverse N×N transform. STEP 712 in one example comprises separation of image 716 in domain 308 into four N/2×N/2 blocks 718. STEP 714 in one example comprises applying an N/2×N/2 transform 720 to each block 718.

Figure 8:
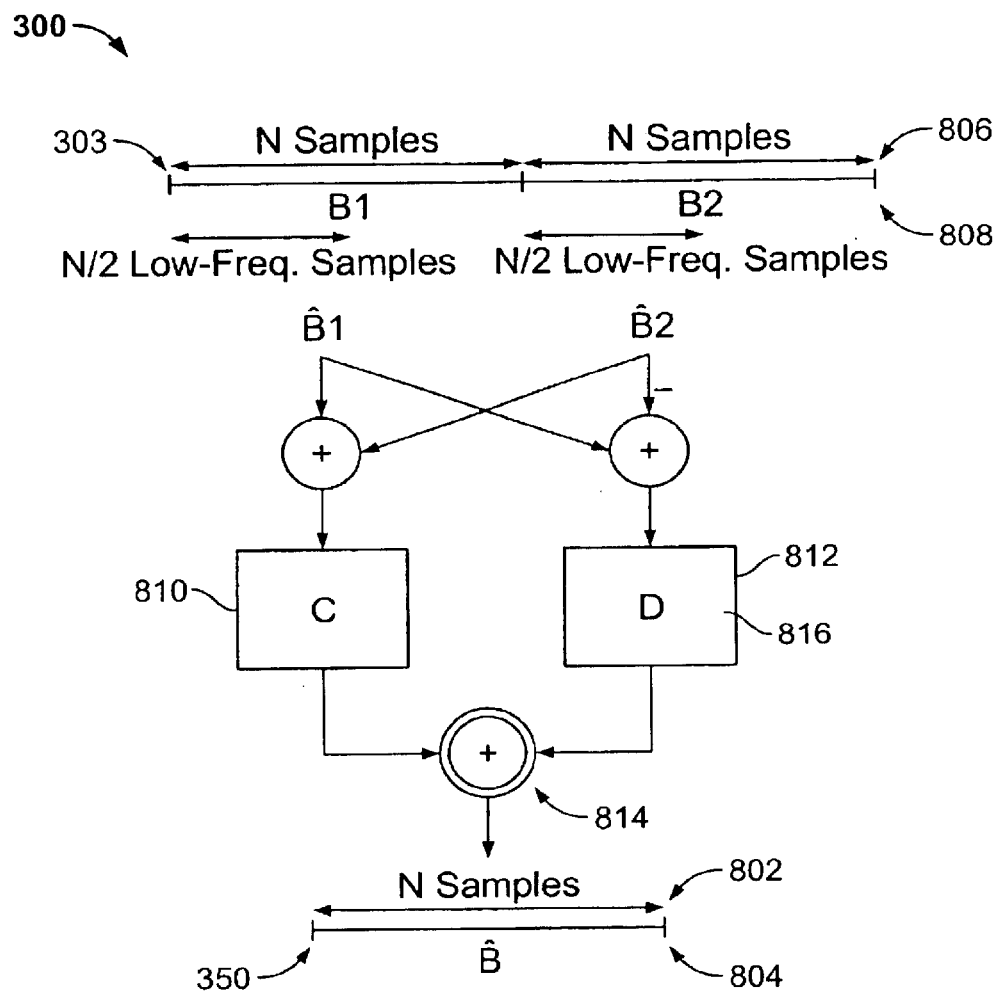
FIG. 8 depicts exemplary logic that is employed by one example of the transform component of the system of FIG. 1, for decreasing the size of a one-dimensional image through employment of sparse matrix multiplication.

Turning to FIG. 8, logic 300 outputs (e.g., in a transform domain) size 802 of image 804 that is decreased relative to size 806 of image 808. For example, image 804 comprises a one-dimensional image, and image 808 comprises a one-dimensional image. In one example, logic 300 employs matrices 810 and 812 that are (e.g., relatively) sparse. For instance, matrices 810 and 812 comprise sparse matrices in which a majority of entries 816 have a value of zero. In another example, logic 300 employs matrices 810 and 812 that are very sparse. For instance, matrices 810 and 812 comprise very sparse matrices in which nearly and/or approximately seventy-five percent of entries 816 have a value of zero. Such sparseness of matrices 810 and 812, in one example, serves to provide (e.g., tremendous) computational savings in multiplication involving matrices 810 and 812. Additional structure of matrices 810 and 812, in one example, serves to provide further computational savings in, for instance, an addition operation of STEP 814, as described herein.

Figure 9:
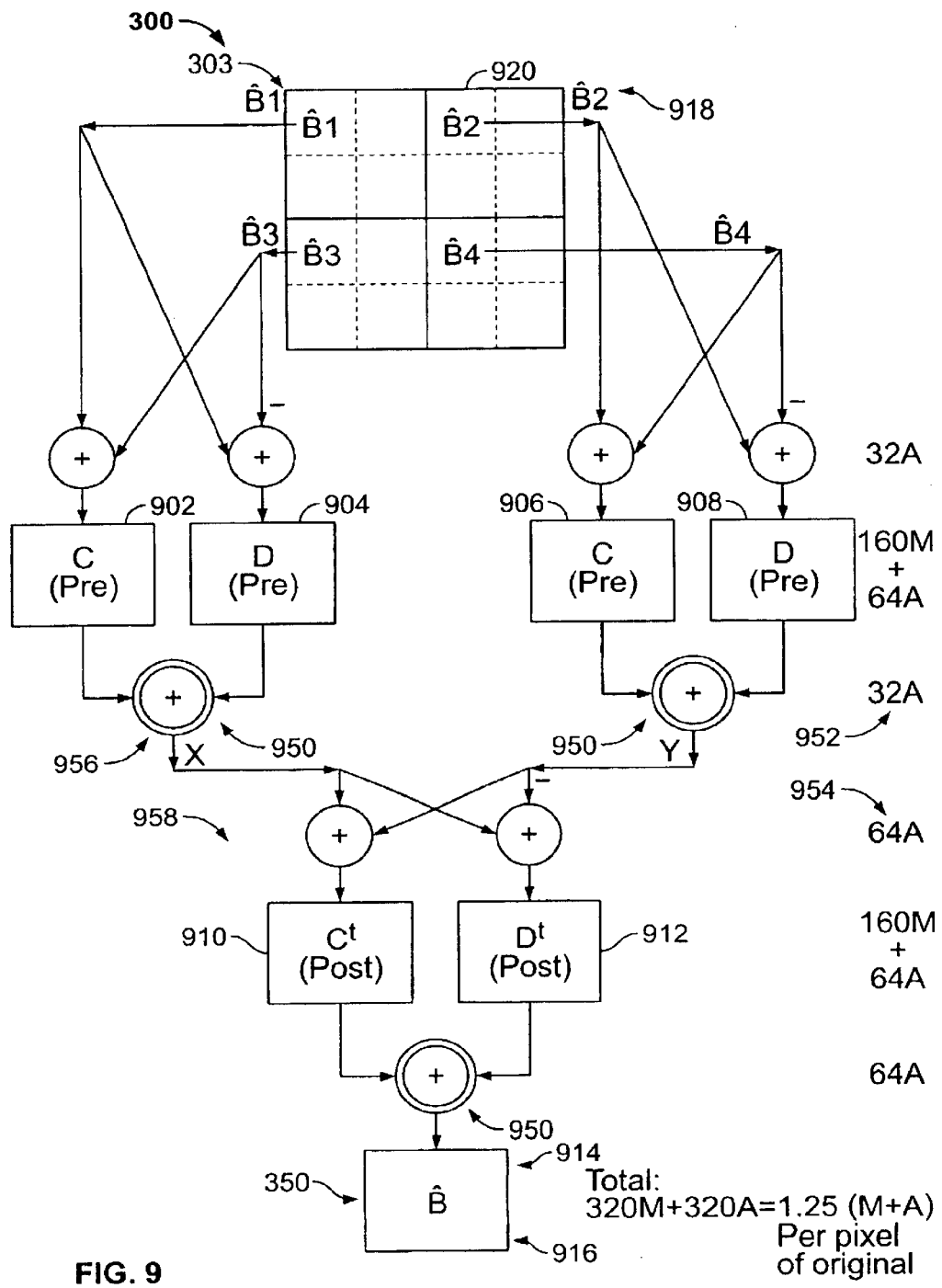
FIG. 9 depicts exemplary logic that is employed by one example of the transform component of the system of FIG. 1, for decreasing the size of a two-dimensional image through employment of sparse matrix multiplication.

Turning to FIG. 9, logic 300 employs matrices 902, 904, 906, and 908 that are sparse in one example. Logic 300 serves to obtain size 914 of image 916 that is decreased relative to size 918 of image 920. For example, image 916 comprises a two-dimensional image, and image 920 comprises a two-dimensional image. Logic 300 in one example employs transpose 910 of a matrix and transpose 912 of a matrix. For instance, logic 300 employs matrices 902, 904, 906, and 908 for pre-multiplication, and logic 300 employs transpose 910 of a matrix and transpose 912 of a matrix for post-multiplication, as will be appreciated by those skilled in the art.

Figure 10:
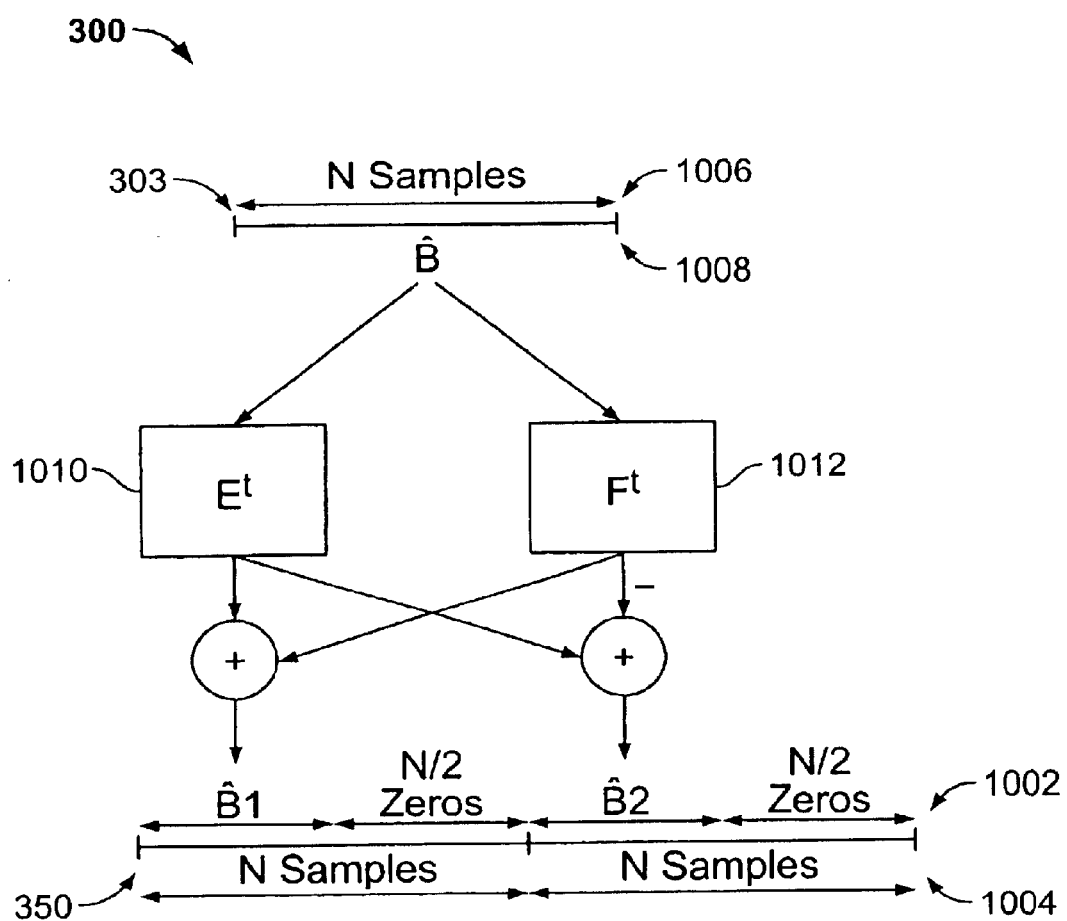
FIG. 10 depicts exemplary logic that is employed by one example of the transform component of the system of FIG. 1, for increasing the size of a one-dimensional image through employment of sparse matrix multiplication.

Referring to FIG. 10, logic 300 in one example results in size 1002 of image 1004 such as a one-dimensional image, that is increased relative to size 1006 of image 1008 such as a one-dimensional image. Logic 300 in one example employs transpose 1010 of a very sparse matrix and transpose 1012 of a very sparse matrix.

Referring to FIG. 11, logic 300 obtains size 1102 of image 1104 such as a two-dimensional image, that is increased relative to size 1106 of image 1108 such as a two-dimensional image.

Referring now to FIGS. 12–13, logic 300 changes size 1202 of image 1204 in obtaining size 1206 of image 1208. Logic 300 in one example obtains a preselected ratio of size 1206 of image 1208 relative to size 1202 of image 1204. For instance, the ratio between size 1206 and size 1202 comprises a factor of two. In another example, the ratio between size 1206 and size 1202 excludes a factor of two. In a further example, the ratio between size 1206 and size 1202 comprises a non-integer ratio.

Referring to FIG. 12, logic 300 in one example serves to obtain a relative decrease in size of an image by a factor of (M1×M2)/(N1×N2). For instance, logic 300 serves to decrease image height by a factor of M1/N1 and decrease image width by a factor of M2/N2. So, in one example, selection of values for variables M1, M2, N1, and N2 of the factor (M1×M2)/(N1×N2) provides increased control and/or tunability for system 100 (FIG. 1).

Referring to FIG. 13, logic 300 in one example serves to increase size of an image by a factor of (M1×M2)/(N1×N2). For instance, logic 300 serves to increase image height by a factor of M1/N1 and increase image width by a factor of M2/N2. So, in one example, selection of values for variables M1, M2, N1, and N2 of the factor (M1×M2)/(N1×N2) provides increased control and/or tunability for system 100 (FIG. 1).

For explanatory purposes, a detailed technical description is now presented.

$T^{(N)}$ comprises an N×N discrete cosine transform matrix. In one example, $T^{(N)} = \{t(k,n)\}$, where $t(k,n)$ denotes the matrix entry in the k-th row and n-th column, according to the following exemplary Equation (1.1).

$$t(n, k) = 1/\sqrt{N} \; ; k = 0, 0 \leq n \leq N-1 \quad (1.1)$$

$$= \sqrt{\frac{2}{N}} \cos\frac{\pi(2n+1)k}{2N} ; 1 \leq k \leq N-1; 0 \leq n \leq N-1$$

$$0 \leq n \leq N-1$$

In addition, the one-dimensional DCT of a sequence $u(n)$, $0 \leq n \leq N-1$, is given by $v(k)$, $0 \leq k \leq N-1$, which is defined in the following exemplary Equation (1.2).

$$v(k) = \sum_{n=0}^{N-1} t(k, n) u(n); 0 \leq k \leq N-1 \quad (1.2)$$

One example employs vectors u and v to denote the sequences $u(n)$ and $v(k)$, and represent Equation (1.1) by the following exemplary Equation (1.3).

$$v = T^{(N)} u \quad (1.3)$$

Assume that a matrix A is given. The transpose A' of the matrix A in one example comprises another matrix whose i-th column is the same as the i-th row of A. For example, the (j,i)th entry of A' comprises the (i,j)th entry of A.

The DCT in one example is a unitary transform. So, taking the transpose of matrix $T^{(N)}$ in one example results in an inverse DCT matrix $T^{(N)'}$. Given vector v of Equation (1.3), one can, for instance, obtain vector u through the following exemplary Equation (1.4).

$$u = T^{(N)'} v \quad (1.4)$$

As noted above with reference to Equation (1.1), $T^{(N)}$ comprises the N×N DCT matrix. In another example, $T^{(N/2)}$ comprises an N/2×N/2 DCT matrix.

An N1×N2 matrix comprises N1 rows each of width N2. One example of logic 300 obtains the N1×N2 DCT of an N1×N2 two-dimensional signal as follows. Logic 300, for instance, first employs the matrix $T^{(N2)}$ to take the N2-point DCT of each row of the signal to obtain data. Logic 300, for instance, second applies an N1-point DCT to each column of this data through employment of the matrix $T^{(N1)}$.

An exemplary definition of the matrices $T_L$, $T_R$, $T_s$, C, D, E, and F, is now presented.

In one example, "$T_L$" denotes a matrix that comprises the N/2 leftmost columns of the matrix $T^{(N)}$. In a further example, "$T_R$" denotes a matrix that comprises the N/2 rightmost columns of the matrix $T^{(N)}$. So, in one example, $T^{(N)} = [T_L T_R]$. Further, in one example, each of matrices $T_L$ and $T_R$ comprises a size of N/2×N/2. One example assumes that N is divisible by two. In a further example, "$T_s$" denote a matrix $T^{(N/2)}$. So, in one example, the following exemplary Equations (1.5, 1.6, 1.7, and 1.8) result.

$$C = \frac{1}{\sqrt{2}} \frac{1}{2}((T_L T_s^t) + (T_R T_s^t)) \quad (1.5)$$

$$D = \frac{1}{\sqrt{2}} \frac{1}{2}((T_L T_s^t) - (T_R T_s^t)) \quad (1.6)$$

$$E = \sqrt{2} \frac{1}{2}((T_L T_s^t) + (T_R T_s^t)) \quad (1.7)$$

$$F = \sqrt{2} \frac{1}{2}((T_L T_s^t) - (T_R T_s^t)) \quad (1.8)$$

In one example, the matrices $T_L$, $T_s'$ and $T_R T_s'$ are sparse, since the matrices $T_L T_s'$ and $T_R T_s'$ have nearly fifty percent of their entries as zeros. In a further example, the matrices C, D, E, and F are very sparse, since the matrices C, D, E, and F have nearly seventy-five percent of their entries as zeros. Similar conclusions hold for other transforms that satisfy certain orthogonality and symmetry properties like the DCT in one example when other of the matrices herein are defined in a like manner (e.g., by appropriately partitioning $T^{(N)}$ into $T_L$ and $T_R$). Examples of such transforms include the Fourier transform and the Hadamard transform.

An illustrative example of the matrix C in Equation (1.5) for the case of N=8 follows below.

| | | | |
|---|---|---|---|
| 0.5000 | 0 | 0 | 0.0000 |
| 0.0000 | 0.2079 | 0.0000 | 0.0114 |
| 0 | 0 | 0 | 0 |
| 0.0000 | 0.3955 | 0.0000 | 0.0488 |
| 0 | 0 | 0.5000 | 0 |
| 0.0000 | 0.1762 | 0.0000 | 0.2452 |
| 0 | 0 | 0 | 0 |
| 0 | 0.1389 | 0 | 0.4329 |

In the above example, matrix C has only ten non-zero entries out of a total of 8*4=32 entries. So, nearly seventy-five percent of the elements of matrix C are zeros.

For illustrative purposes, now is presented a detailed discussion of decreasing of image size in the compressed domain.

One example serves to decrease the size of an image in a situation where the "original" (e.g., input) image is given in a compressed domain with an expectation that the output image will be provided in the compressed domain. The compressed domain in one example corresponds to an N×N block-DCT domain. For instance, the Joint Photographic Experts Group ("JPEG") still image compression standard and the Moving Picture Experts Group ("MPEG") video compression standards MPEG-1 and MPEG-2, employ an 8×8 DCT.

In one example, referring to FIGS. 3–4, an input to logic 300 comprises a one-dimensional image or a one-dimensional signal. For illustrative purposes, FIG. 3 specifically depicts a case of N=8, such that the signal is given in terms of 8×8 block DCT coefficients. Those skilled in the art will understand treatment of any general N, such as is represented in FIG. 4, from the discussion herein of the exemplary case of N=8 that is represented in FIG. 3.

Referring to FIG. 3, an input to logic 300 at STEP 372 in one example comprises image 315. For instance, image 315 comprises an N×N DCT domain representation of a spatial domain signal that comprises image 301. As preparation in one example, STEP 370 splits the spatial domain signal into sets 304 of samples 306 of size. N. FIG. 3 depicts one example of two adjacent sets 304 of samples 306 each of size N. Logic 300 of FIG. 3 denotes these samples 306 of size N as $b_1$ and $b_2$. Logic 300 of FIG. 3 in one example treats all vectors as column vectors. Logic 300 of FIG. 3 in one example denotes row vectors as transposes of column vectors. Logic 300 of FIG. 3 in one example applies the N×N DCT transform to each of $b_1$ and $b_2$ to obtain $B_1$ and $B_2$, respectively. So, in one example, $B_1 = T^{(N)} b_1$ and $B_2 = T^{(N)} b_2$. The input image 315 in one example comprises N×N block DCT coefficients. In one example, $B_1$ and $B_2$ represent the N×N block DCT coefficients for two instances of the size N blocks of image 301. $B_1$ and $B_2$ in one example comprise image 315 in domain 316, for instance, the N×N DCT domain. For example, sets 319 of low-frequency coefficients 322 of samples 317 comprise N/2 low-frequency samples of $B_1$ and $B_2$.

Again referring to FIG. 3, the N/2 low-frequency samples of $B_1$ and $B_2$, in one example, comprise samples that correspond to k=0 through N/2−1 of Equation (1.2), above.

In another example, the low-frequency samples correspond to a different set of values for the k indices, such as for an instance of logic 300 that employs a transform other than DCT.

For explanatory purposes, this discussion refers to a hatted symbol of logic 300 represented in FIGS. 3–13 by employing an "h" with the symbol. For example, in this discussion "Bh$_1$" corresponds to "B$_1$" of logic 300 and "bh$_1$" corresponds to "b$_1$" of logic 300.

Referring further to FIG. 3, logic 300 in one example employs the N/2 low-frequency samples of each of $B_1$ and $B_2$ to obtain Bh$_1$ and Bh$_2$, respectively.

Still referring to FIG. 3, logic 300 in one example applies the N/2×N/2 inverse DCT transform using the transpose of matrix $T^{(N/2)}$. Logic 300 employs, for instance, Equation (1.4), above. For example, logic 300 substitutes $T^{(N/2)}$ for T of Equation (1.4). Logic 300 in one example applies the N/2×N/2 inverse DCT transform to each of Bh$_1$ and Bh$_2$ to obtain bh$_1$ and bh$_2$, respectively, as sets 326 of samples 324, STEP 318. In one example, bh$_1$ and bh$_2$ represent downsized versions of $b_1$ and $b_2$, respectively, in the spatial domain, as one example of domain 308. In a further example, logic 300 concatenates bh$_1$ and bh$_2$ to obtain bh=(bh$_1$ bh$_2$), as one example of samples 330. For example, bh is in the spatial domain, as one example of domain 308. For instance, bh represents a downsized version of ($b_1$ $b_2$) that comprises one example of image 301 as one-dimensional image 302. Logic 300 in one example applies an N×N transform (e.g., a "forward" transform) to bh to obtain a (e.g., final) output block Bh, as one example of N samples 336 in domain 316, for instance, the transform domain. So, Bh in one example represents a downsized version of the original signal in the transform domain.

The discussion above leads to a number of exemplary equations, including, for example, the following exemplary Equation (2.1.1).

$$Bh = T^{(N)}(bh) = T^{(N)}[bh_1^t \; bh_2^t]^t = [T_L \; T_R][bh_1^t \; bh_2^t]^t \quad (2.1.1)$$
$$= [T_L \; T_R][(T_s^t Bh_1)^t \; (T_s^t Bh_2)^t]^t$$
$$= (T_L \; T_s^t) Bh_1 + (T_R \; T_s^t) Bh_2$$

From the properties of the DCT matrices, it can be shown that $T_L T_s^t$ and $T_R T_s^t$ are sparse, since, for example, nearly fifty percent of the entries of each of these matrices are zero. So, in one example, Equation. (2.1.1) allows advantageously fast computations.

Another example allows an advantageous further increase in computational speed.

In one example, the matrices $T_L T_s^t$ and $T_R T_s^t$ have identical entries except for a possible sign change. Specifically, if i+j divided by two yields an integer result, then the (i,j)th element of $T_L T_s^t$ is the same as the (i,j)th element of $T_R T_s^t$. Otherwise, if i+j divided by two yields a non-integer result, then the (i,j)th element of $T_L T_s^t$ is opposite in sign to the (i,j)th element of $T_R T_s^t$. So, one example yields even greater sparseness of matrices C, D, E, and F of Equations (1.5)–(1.8), since about 75% of the entries of matrices C, D, E, and F in the example are zeros. The example employs a factor of √2 in defining the matrices C, D, E, and F to account for different sizes of the DCTs. Solving for $T_L T_s^t$ and $T_R T_t^t$ from Equations (1.5) and (1.6) and substituting the result in Equation (2.1.1) yields the following exemplary Equation (2.1.2).

$$Bh = C(Bh_1 + Bh_2) + D(Bh_1 - Bh_2) \quad (2.1.2)$$

Logic 300 of FIG. 8 in one example implements Equation (2.1.2). For example, logic 300 outputs Bh as image 804 that has size 802. Logic 300 in one example serves to decrease size 802 of image 804 relative to size 806 of image 808 that comprises input to logic 300. In a further example, implementation of Equation (2.1.2) in logic 300 of FIG. 8 allows advantageously fast computation(s) in execution of logic 300. The following reasons in one example contribute to an increased-computational speed for logic 300.

As a first exemplary reason, referring to FIG. 8, matrices 810 and 812 are (e.g., very) sparse. So, employment of matrices 810 and 812 in logic 300 makes matrix multiplication of Equation (2.1.2) computationally inexpensive. Sparseness in one example of matrices 810 and 812 results from numerous occurrences of zero for entries of matrices 810 and 812. So, logic 300 desirably need not perform a significant number of multiplications that would otherwise be performed absent the numerous occurrences of zero in matrices 810 and 812, as will be appreciated by those skilled in the art.

As a second exemplary reason, referring again to FIG. 8, matrices 810 and 812 in one example comprise a particular structure that guarantees that some of the operands of an addition operation in STEP 814, are zero. So, logic 300 in one example comprises an advantageously-decreased number of addition operations.

FIG. 5 illustrates one example of employment of logic 300 with two-dimensional images such, as images 504 and 508. For instance, image 504 comprises N×N transform coefficients. Logic 300 in one example receives image 504 as input and produces image 508 as output. In one example, logic 300 divides image 504 into N×N blocks 516.

As depicted in FIG. 5 for illustrative purposes, logic 300 in one example divides image 504 into four (e.g., adjacent) instances of N×N block 516. In addition, logic 300 in one example employs the four instances of N×N block 516 to obtain a single instance of N×N block 530 as image 508, for example, as output Bh of logic 300. In one example, logic 300 changes the four instances of N×N block 516 to the single instance of N×N block 530 to obtain a reduction in size by a factor of two in each dimension. In one example, low-frequency sub-blocks 514 each comprise size N/2×N/2 that correspond to k=0 through N/2−1 in Equation (1.2), for instance, in vertical and horizontal directions. STEP 510 applies an inverse N/2×N/2 transform to each N×N block 516 to obtain four N/2×N/2 blocks 520, for example, $bh_1$, $bh_2$, $bh_3$, $bh_4$, in (e.g., spatial) domain 308. In one example, the four N/2×N/2 blocks 520 represent a downsized version of original image 504. STEP 521 in one example concatenates the four N/2×N/2 blocks 520 to obtain a single instance bh of N×N block 528. STEP 522 applies an N×N transform to the single instance bh of N×N block 528 to obtain the output instance Bh of N×N block 530 as image 508 in (e.g., transform) domain 316.

An exemplary determination of mathematical equations corresponding to the discussion above, plus a determination that the resultant equations can be manipulated to involve matrix multiplications with only sparse matrices, allows one to obtain a computationally efficient way to implement logic 300. In one example, application of the DCT to an N×N (e.g., two-dimensional) block corresponds to pre- and post-multiplication by the matrix T. So, one example describes the operations above by the following exemplary mathematically description.

$$Bh = T^{(N)} bh \quad T^t = [T_L \quad T_R] \begin{vmatrix} bh_1 & bh_2 \\ bh_3 & bh_4 \end{vmatrix} \begin{vmatrix} T_L^t \\ T_R^t \end{vmatrix} \quad (2.1.3)$$

$$= [T_L \quad T_R] \begin{vmatrix} T_s^t bh_1 T_s & T_s^t bh_2 T_s \\ T_s^t bh_3 T_s & T_s^t bh_4 T_s \end{vmatrix} \begin{vmatrix} T_L^t \\ T_R^t \end{vmatrix}$$

$$= ((T_L \quad T_s^t)Bh_1 + (T_R \quad T_s^t)Bh_3)(T_R \quad T_s^t)^t +$$

$$((T_L \quad T_s^t)Bh_2 + (T_R \quad T_s^t)Bh_4)(T_R \quad T_s^t)^t$$

In one example, $(T_L \ T_s^t)$ and $(T_R \ T_s^t)$ are sparse. So, exemplary Equation (2.1.3) presents computationally fast calculations for logic 300 that operates on, for instance, two-dimensional images. One example precomputes the matrices $(T_L \ T_s^t)$ and $(T_R \ T_s^t)$. One example replaces $(T_L \ T_s^t)$ and $(T_R \ T_s^t)$ by the matrices C and D defined in Equations (1.5) and (1.6) for substitution in Equation (2.1.3), to obtain a result. Through rearrangement of terms of this result, one example obtains the following exemplary Equations (2.1.4), (2.1.5), and (2.1.6).

$$Bh=(X+Y)C^t+(X-Y)D^t \quad (2.1.4)$$

where $$X=C(Bh_1+Bh_3)+D(Bh_1-Bh_3) \quad (2.1.5)$$

and $$Y=C(Bh_2+Bh_4)+D(Bh_2-Bh_4) \quad (2.1.6)$$

In one example, a striking similarity exists between Equation (2.1.2), for an illustrative one-dimensional case, and each of exemplary Equations (2.1.4), (2.1.5), and (2.1.6), for an illustrative two-dimensional case. Equations (2.1.4), (2.1.5), and (2.1.6) in one example represent a computationally (e.g., very) fast way to implement logic 300, such as in FIG. 9.

Referring to FIG. 9, a number of (e.g., all) instances of (e.g., addition) operation component 950 have some of their operands guaranteed to be zeros, and therefore advantageously avoid a need to perform a number of additions operations.

Again referring to FIG. 9, exemplary computations 952 and 954 correspond to exemplary logic subportions 956 and 958, respectively, of logic 300. In one example, N=8. In a further example, "32A" represents thirty-two addition operations and "64M" represents sixty-four multiplication operations. For instance, if N=8 then an exemplary result of computations 952 and 954 comprises 320/(8*8)=1.25 addition operations and 1.25 multiplication operations, for example, per pixel of the original image (e.g., image 920).

In one example, a similarity between Equation (2.1.2), for the one-dimensional case, and each of Equations (2.1.4), (2.1.5), and (2.1.6), for the two-dimensional case, advantageously allows performance of operations in a separable fashion. For instance, logic 300 that is employable with an exemplary two-dimensional case, performs "one-dimensional" computations along columns to get X and Y, and (e.g., subsequently) performs "one-dimensional" computations along rows of X and Y to get Bh, for example, as output image 916. Such performance of "one-dimensional" computations for a two-dimensional case, in one example, allows an advantageously-increased computational speed of logic 300.

Those skilled in the art will appreciate that additional ways exist for writing Equation (2.1.3) in a form similar to Equations (2.1.4), (2.1.5), and (2.1.6), for instance, to comprise the same number of computations as Equations (2.1.4), (2.1.5), and (2.1.6). For instance, another example of Equation (2.1.5) employs $Bh_1$ and $Bh_2$, and a further example employs $Bh_3$ and $Bh_4$ in Equation (2.1.6), such as where logic 300 initially performs processing along rows and subsequently performs processing along columns.

An exemplary description of logic 300 that implements Equations (2.1.3)–(2.1.6) comprises:

{
   Receiving a plurality of image parts in a transform domain.
   Applying simple linear processing on the low frequency parts of
   each image part.
   Multiplying (either pre or post) each image part thus obtained by
   sparse matrices.
   Applying simple linear processing to the parts thus obtained.
   Multiplying (either post or pre) each image part thus obtained by
   sparse matrices (one example excludes this multiplication for
   an illustrative one-dimensional case).
   Applying simple linear processing on the parts thus obtained to get
   a final set of image parts representing the final
   image in a transform domain.
}

"Simple linear processing" in one example comprises an identity operation in which output equals input, such as for Equation (2.1.3), and in another example comprises additions and/or subtractions, such as for Equations (2.1.4)–(2.1.6).

One or more other examples employ analogous definitions of matrices such as matrices T, $T_L$, C, D, for transforms other than the DCT. In one example, a sparseness of matrices such as matrices C and D, depends only on orthogonality and symmetry properties of the N×N DCT matrix in relation to the N/2×N/2 DCT matrix. So, in one example, the sparseness property holds for other transforms, for example, transforms having properties such as properties of the Fourier transform and the Hadamard transform. One example obtains computational savings with employment of other such transforms.

One example employs the basis function of a selected transform that is employed with a particular instance of logic 300, to construct the matrices C and D for the particular instance of logic 300.

Referring to FIG. 12, one example of logic 300 reduces the size of an image by any selected power of two. In one example, logic 300 changes size of an image by a power of two through employment of a direct implementation. In another example, repeated application of a certain instance of logic 300 that serves to change the size of an image by a factor of two, serves in another instance of logic 300 to reduce the size of the image by additional factors of two.

Referring to FIG. 7, logic 300 in one example serves to increase the size of an image in the compressed domain. For example, one can consider an instance of logic 300 that serves to increase the size of an image, to comprise an inverse of an instance of logic 300 that serves to decrease the size of an image. One example of logic 300 comprises first and second independent implementations. The first implementation in one example performs the decreasing of the image size. The second implementation in one example performs the increasing of the image size.

Again referring to FIG. 7, logic 300 in one example receives N×N transform coefficients as an input image 706, and outputs an enlarged image in the same format, as image 702.

Referring still to FIG. 7, logic 300 in one example receives as input image 706 an N×N transform domain representation of a two-dimensional image. Instance Bh of image 706 comprises an exemplary N×N transform domain block. One example obtains four N×N transform domain blocks out of this N×N transform domain block, to effect a size change (e.g., increase) by a factor of two in each dimension.

Further referring to FIG. 7, STEP 710 in one example applies an N×N inverse transform to Bh to obtain an N×N block as image 716 in (e.g., spatial) domain 308. STEP 712 in one example splits the N×N block into four N/2×N/2 blocks 718. STEP 714 in one example applies an N/2×N/2 (e.g., discrete cosine) transform to each block 718, to obtain four N/2×N/2 blocks $Bh_1$, $Bh_2$, $Bh_3$, and $Bh_4$. Each of blocks $Bh_1$, $Bh_2$, $Bh_3$, and $Bh_4$ in one example comprises a low-frequency sub-block of a corresponding N×N block. STEP 714 further sets to zero the high-frequency coefficients of each of these N×N blocks. Image 704 in one example comprises four such blocks as the desired enlarged version of the block Bh in the compressed (e.g., transform) domain.

For illustrative purposes, the following exemplary description is presented.

Since $T^t T^{(N)} = I$ (N×N identity matrix) and $T^{(N)} = [T_L \; T_R]$ one obtains:

$$T_L{}^t T_L = T_R{}^t T_R = I_{N/2} \text{ and } T_L{}^t T_R = T_R{}^t T_L = O_{N/2}$$

where $I_{N/2}$ and $O_{N/2}$ denote the N/2×N/2 identity and zero matrix, respectively. So:

$$I_{N/2} = T_s(T_L{}^t T_L) T_s{}^t (T_L T_s{}^t)^t (T_L T_s{}^t)$$

Similarly:

$$(T_L T_s{}^t)^t (T_L T_s{}^t) = I_{N/2} = (T_R T_s{}^t)^t (T_R T_s{}^t) \tag{2.1.7}$$

$$(T_L T_s{}^t)^t (T_R T_s{}^t) = O_{N/2} = (T_R T_s{}^t)^t (T_L T_s{}^t) \tag{2.1.8}$$

So, one particular example of logic 300 that increases the size of an image comprises exactly the reverse logic of a certain example of logic 300 that decreases the size of an image. Employment of Equation (2.1.3) in conjunction with orthogonality properties of the matrices $(T_R T_s{}^t)$ and $(T_L T_s{}^t)$ in exemplary Equations (2.1.7) and (2.1.8), allows a determination of the following exemplary Equations (2.1.9)–(2.1.12).

$$Bh_1 = (T_L T_s{}^t)^t Bh (T_L T_s{}^t) \tag{2.1.9}$$

$$Bh_2 = (T_L T_s{}^t)^t Bh (T_R T_s{}^t) \tag{2.1.10}$$

$$Bh_3 = (T_R T_s{}^t)^t Bh (T_L T_s{}^t) \tag{2.1.11}$$

$$Bh_4 = (T_R T_s{}^t)^t Bh (T_R T_s{}^t) \tag{2.1.12}$$

Equations (2.1.9)–(2.1.12) in one example of logic 300 of FIG. 7, allow a determination of the N/2×N/2 low-frequency sub-blocks $Bh_1$, $Bh_2$, $Bh_3$, and $Bh_4$. One example of logic 300 receives input in the form of image block Bh in the transform domain and obtains output in the form of the N/2×N/2 low-frequency sub-blocks $Bh_1$, $Bh_2$, $Bh_3$, and $Bh_4$ in the transform domain.

One example of logic 300 implements Equations (2.1.9)–(2.1.12) to obtain advantageously fast computation through employment of (e.g., very) sparse embodiments of matrices $(T_L T_s{}^t)$ and $(T_R T_s{}^t)$.

Another example of logic 300 employs $(T_L T_s{}^t)$ and $(T_R T_s{}^t)$ per the definition of matrices E and F in Equations (1.7)–(1.8) for substitution in Equations (2.1.9)–(2.1.12) to obtain the following exemplary Equations (2.1.13)–(2.1.17).

$$Bh_1 = (P+Q)+(R+S) \tag{2.1.13}$$

$$Bh_2 = (P+Q)+(R-S) \tag{2.1.14}$$

$$Bh_3 = (P+Q)-(R+S) \tag{2.1.15}$$

$$Bh_4 = (P+Q)-(R-S) \tag{2.1.16}$$

where:

$$P = (E^t Bh) E; \; Q = (E^t Bh) F; \; R = (F^t Bh) E; \; S = (F^t Bh) F. \tag{2.1.17}$$

Equations (2.1.13)–(2.1.16) account for a factor, for example, a factor of two due to the different sizes of the DCTs, in the definitions of E and F.

In one example, exemplary bracketing in Equations (2.1.13)–(2.1.17) conveys an illustrative ordering of computations. Equations (2.1.13)–(2.1.17) in one example represent a (e.g., much) faster way to carry out the computations in Equations (2.1.9)–(2.1.12), since in one example nearly seventy-five percent of the entries in matrices E and F have the value of zero. Equations (2.1.13)–(2.1.17) in one example arrange the multiplications and additions in a hierarchical manner, to advantageously obtain a further increase in computational speed.

For illustrative purposes, FIG. 11 depicts such an implementation of logic 300. Exemplary computations 1152 and 1154 correspond to exemplary logic subportions 1156 and 1158, respectively, of logic 300. In one example, N=8. In a further example, "96A" represents ninety-six addition operations and "160M" represents one hundred sixty multiplication operations. For instance, if N=8 then an exemplary result of computations 1152 and 1154 comprises 320/(8*8)=1.25 addition operations and 1.25 multiplication operations, for example, per pixel of the upsized image.

In one example, a similarity between logic 300 of FIG. 10, for the one-dimensional case, and logic 300 of FIG. 11, for the two-dimensional case, advantageously allows an interpretation of Equations (2.1.13)–(2.1.17) as corresponding to carrying out one-dimensional operations along the columns of Bh and (e.g., subsequently) along the rows of Bh.

One example employs ways to write Equations (2.1.9)–(2.1.12) in a form similar to Equations (2.1.14)–(2.1.17), for example, while involving the same number of computations. One example regroups portions of Equation (2.1.17) to carry out computations in the following exemplary Equation (2.1.18).

$$P=E^t(BhE); Q=E^t(BhF); R=F^t(BhE); S=F^t(BhF). \quad (2.1.18)$$

In view of Equations (2.1.9)–(2.1.18), one example describes logic 300 for upsizing as follows.

```
{
    Receiving a plurality of image parts in a transform domain.
    Multiplying (pre or post) each image part by sparse matrices.
    Multiplying (post or pre) each of the image parts thus obtained by
    sparse matrices (one example excludes this multiplication for
    an illustrative one-dimensional case).
    Applying simple linear processing on the image parts thus obtained.
    The image parts thus obtained are made the low-frequency parts of
    the corresponding image parts in the final image which is also in
    the transform domain.
}
```

"Simple linear processing" in one example comprises an identity operation in which output equals input such as for Equations (2.1.9)–(2.1.12), and in another example comprises additions and/or subtractions of two or more image parts to obtain a new set of image parts. In a further example, "simple linear processing" comprises the following exemplary operation that corresponds to Equations (2.1.13)–(2.1.18). In one example, the input comprises P, Q, R, and S, and the output comprises Bh1, Bh2, Bh3, and Bh4.

$$PQ1=P+Q;$$

$$PQ2=P-Q;$$

$$RS1=R+S;$$

$$RS2=R-S;$$

$$Bh1=PQ1+RS1;$$

$$Bh2=PQ2+RS2;$$

$$Bh3=PQ1-RS1;$$

$$Bh4=PQ2-RS2;$$

One or more other examples employ analogous definitions of matrices, such as matrices T, $T_L$, E, F, for transforms other than the DCT. In one example, the sparseness of matrices such as matrices E and F depends only on orthogonality and symmetry properties of the N×N DCT matrix in relation to the N/2×N/2 DCT matrix. So, in one example, the sparseness property holds for other transforms, for example, transforms having properties such as properties of the Fourier transform and the Hadamard transform. One example obtains computational savings with employment of such other transforms.

One example employs the basis function of a selected transform that is employed with a particular instance of logic 300, to construct the matrices E and F for the particular instance of logic 300.

Referring to FIG. 13, one example of logic 300 increases the size of an image by any selected power of two. In one example, logic 300 changes a size of an image by a power of two through employment of a direct implementation. In another example, repeated application of a certain instance of logic 300 that serves to change the size of an image by a factor of two, serves in another instance of logic 300 to increase the size of the image by additional factors of two.

Logic 300 in one example implements an upsizing scheme irrespective of whether or not the originally input image, resulted from an implementation in logic 300 of a downsizing scheme.

Exemplary additional details for one example of logic 300 are provided in Rakesh Dugad and Narendra Ahuja, "A Fast Scheme for Altering Resolution in the Compressed Domain" (Proceedings 1999 IEEE Computer Society Conference on Computer Vision and Pattern Recognition, Cat. No PR00149, Jun. 23–25, 1999, Fort Collins, Colo., USA, IEEE Comput. Soc. Part Vol. 1, 1999, pp. 213–18 Vol. 1, Los Alamitos, Calif., USA).

The flow diagrams depicted herein are just exemplary. There may be many variations to these diagrams or the steps (or operations) described therein without departing from the spirit of the invention. For instance, the steps may be performed in a differing order, or steps may be added, deleted or modified. All these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method, comprising the steps of:
receiving first and second image parts; and
applying sparse matrix multiplication to each of the first and second image parts through utilization of matrices represented by $k1 \cdot ((T_L T^t_s)+(T_R T^t_s))$ and $k2 \cdot ((T_L T^t_s)-(T_R T^t_s))$, wherein superscript t denotes transpose of a matrix, k1 and k2 are scalar constants $T_L$ and $T_R$ are N/2 leftmost and N/2 rightmost columns respectively of an N×N non-identity matrix $T=[T_L T^R]$ such that $T T^t$ is an identity matrix and $T_s$ is an N/2×N/2 non-identity matrix such that $T_s T^t_s$ is an identity matrix.

2. The method of claim 1, wherein the matrices represented by $k1 \cdot ((T_L t^t_s)+(T_R T^t_s))$ and $k2 \cdot ((T_t T^t_s)-T_R T^t_s))$ each include a majority of entries with a value of zero.

3. The method of claim 1, wherein the step of receiving the first and second image parts comprises the step of receiving a plurality of image parts that comprise an initial size; and wherein the step of applying sparse matrix multiplication to each of the first and second image parts comprises the step of applying sparse matrix multiplication to each image part of the plurality of image parts to obtain a resultant plurality of image parts that comprise a resultant size different from the initial size.

4. The method of claim 3, wherein the step of applying sparse matrix multiplication to each image part of the plurality of image parts comprises the step of selecting the resultant size and the initial size to comprise a ratio therebetween that includes a factor of two.

5. The method of claim 1, wherein the matrix T is one of a discrete cosine transform (DCT) matrix, a discrete sine transform matrix, a Fourier transform matrix, or a Hadamard transform matrix of size N×N, and the matrix $T_s$ is the corresponding transform matrix of size N/2×N/2.

6. The method of claim 1, wherein the step of receiving the first and second image parts comprises the step of receiving a first plurality of image parts, wherein the step of applying sparse matrix multiplication to each of the first and second image parts comprises the step of applying sparse matrix multiplication to each image part of the first plurality of image parts to obtain a second plurality of image parts, and further comprising the step of applying sparse matrix multiplication to each image part of the second plurality of image parts.

7. The method of claim 6, wherein the step of applying sparse matrix multiplication to each image part of the second plurality of image parts comprises the step of applying sparse matrix multiplication to each image part of the second plurality of image parts to obtain a third plurality of image parts, and further comprising the step of applying simple linear processing to the third plurality of image parts to obtain low-frequency image parts in a transform domain.

8. The method of claim 7, wherein the step of receiving the first and second image parts comprises the step of receiving a plurality of image parts that comprise an initial image length and an initial image height; and wherein the step of applying sparse matrix multiplication to each of the first and second image parts comprises the step applying sparse matrix multiplication to each image part of the plurality of image parts to obtain a resultant plurality of image parts that comprise a resultant image length and a resultant image height, wherein the resultant image length and the initial image length comprise a ratio therebetween that includes a factor of two, wherein the resultant image height and the initial image height comprise a ratio therebetween that includes a factor of two.

9. The method of claim 1, wherein the step of receiving the first and second image parts comprises the steps of:

receiving a first plurality of image parts in a transform domain that each comprise a low-frequency portion; and applying simple linear processing to the low-frequency portion of each image part of the first plurality of image parts to obtain a second plurality of image parts;

wherein the step of applying sparse matrix multiplication to each of the first and second image parts comprises the step of applying sparse matrix multiplication to each image part of the second plurality of image parts to obtain a third plurality of image parts, and further comprising the step of applying simple linear processing to each image part of the third plurality of image parts to obtain a resultant image in the transform domain.

10. The method of claim 9, wherein the step of receiving the first and second image parts comprises the step of receiving a plurality of image parts that comprise an initial image length and an initial image height; and wherein the step of applying sparse matrix multiplication to each of the first and second image parts comprises the step applying sparse matrix multiplication to each image part of the plurality of image parts to obtain a resultant plurality of image parts that comprise a resultant image length and a resultant image height, wherein the initial image length and the resultant image length comprise a ratio therebetween that includes a factor of two, wherein the initial image height and the resultant image height comprise a ratio therebetween that includes a factor of two.

11. The method of claim 1, wherein k1 and k2 each equal $$\frac{1}{\sqrt{2} \cdot 2}.$$

12. The method of claim 1, wherein k1 and k2 each equal $$\frac{\sqrt{2}}{2}.$$

13. A method, comprising the steps of:

receiving first and second image parts through receiving a first plurality of image parts, applying sparse matrix multiplication to each of the first and second image parts through applying sparse matrix multiplication to each image part of the first plurality of image parts to obtain a second plurality of image parts;

applying sparse matrix multiplication to each image part of the second plurality of image parts to obtain a third plurality of image parts; and applying simple linear processing to the third plurality of image parts to obtain low-frequency image parts in a transform domain and obtaining a value of zero for high-frequency image parts in the transform domain.

14. A system, comprising:

a transform component that receives first and second image parts; and a transform component that applies sparse matrix multiplication to each of the first and second image parts through utilization of matricies represented by $k1 \cdot ((T_L T^t_s) + (T_R T^t_s))$ and $k2 \cdot ((T_L T^t_s) - (T_R T^t_s))$, wherein superscript t denotes transpose of a matrix, k1 and k2 are scalar constants, $T_L$ and $T_R$ are N/2 leftmost and N/2 rightmost columns respectively of an N×N non-identity matrix $T=[T_L T_R]$ such that $T T^t$ is an identity matrix and $T_s$ is an N/2×N/2 non-identity matrix such that $T_s T^t_s$ is an identity matrix.

15. The system of claim 14, wherein the matrices represented by $k1 \cdot ((T_L T^t s) + (T_R T^t_s))$ and $k2 \cdot ((T_L T^t_s) - (T_R T^t_s))$ each include a majority of entries with a value of zero.

16. The system of claim 14, wherein the transform component that receives the first and second image parts comprises a transform component that receives a plurality of image parts that comprise an initial size; and wherein the transform component that applies sparse matrix multiplication to each of the first and second image parts comprises a transform component that applies sparse matrix multiplication to each image part of the plurality of image parts to obtain a resultant plurality of image parts that comprise a resultant size different from the initial size.

17. The system of claim 16, wherein the transform component that applies sparse matrix multiplication to each image part of the plurality of image parts comprises a transform component that selects the resultant size and the initial size to comprise a ratio therebetween that includes a factor of two.

18. The system of claim 14, wherein the matrix T is one of a discrete cosine transform (DCT) matrix, a discrete sine transform matrix, a Fourier transform matrix, or a Hadamard transform matrix of size N×N, and the matrix $T_s$ is the corresponding transform matrix of size N/2×N/2.

19. The system of claim 14, wherein the transform component that receives the first and second image parts comprises a transform component that receives a first plurality of image parts, wherein the transform component that applies sparse matrix multiplication to each of the first and second image parts comprises a transform component that applies sparse matrix multiplication to each image part of the first plurality of image parts to obtain a second plurality of image parts, and further comprising a transform component that applies sparse matrix multiplication to each image part of the second plurality of image parts.

20. The system of claim 19, wherein the transform component that applies sparse matrix multiplication to each image part of the second plurality of image parts comprises a transform component that applies sparse matrix multiplication to each image part of the second plurality of image parts to obtain a third plurality of image parts, and further comprising a transform component that applies simple linear processing to the third plurality of image parts to obtain low-frequency image parts in a transform domain.

21. The system of claim 20, wherein the transform component that receives the first and second image parts comprises a transform component that receives a plurality of image parts that comprise an initial image length and an initial image height; and wherein the transform component that applies sparse matrix multiplication to each of the first and second image parts comprises a transform component that applies sparse matrix multiplication to each image part of the plurality of image parts to obtain a resultant plurality of image parts that comprise a resultant image length and a resultant image height, wherein the resultant image length and the initial image length comprise a ratio therebetween that includes a factor of two, wherein the resultant image height and the initial image height comprise a ratio therebetween that includes a factor of two.

22. The system of claim 14, wherein the transform component that receives the first and second image parts comprises:

a transform component that receives a first plurality of image parts in a transform domain that each comprise a low-frequency portion; and a transform component that applies simple linear processing to the low-frequency portion of each image part of the first plurality of image parts to obtain a second plurality of image parts;

wherein the transform component that applies sparse matrix multiplication to each of the first and second image parts comprises a transform component that applies sparse matrix multiplication to each image part of the second plurality of image parts to obtain a third plurality of image parts, and further comprising a transform component that applies simple linear processing to each image part of the third plurality of image parts to obtain a resultant image in the transform domain.

23. The system of claim 22, wherein the transform component that receives the first and second image parts comprises a transform component that receives a plurality of image parts that comprise an initial image length and an initial image height; and wherein the transform component that applies sparse matrix multiplication to each of the first and second image parts comprises a transform component that applies sparse matrix multiplication to each image part of the plurality of image parts to obtain a resultant plurality of image parts that comprise a resultant image length and a resultant image height, wherein the initial image length and the resultant image length comprise a ratio therebetween that includes a factor of two, wherein the initial image height and the resultant image height comprise a ratio therebetween that includes a factor of two.

24. The system of claim 14, wherein k1 and k2 each equal $$\frac{1}{\sqrt{2}\cdot 2}.$$

25. The system of claim 14, wherein k1 and k2 each equal $$\frac{\sqrt{2}}{2}.$$

26. A system comprising:

a transform component that receives first and second image parts through receiving a first plurality of image parts;

a transform component that applies sparse matrix multiplication to each of the first and second image parts to obtain a second plurality of image parts;

a transform component that applies sparse matrix multiplication to each image part of the second plurality of image parts to obtain a third plurality of image parts; and a transform component that applies simple linear processing to the third plurality of image parts to obtain low-frequency image parts in a transform domain and to obtain a value of zero for high-frequency image parts in the transform domain.

27. An article, comprising:

a computer-readable signal-bearing medium;

means in the medium for receiving first and second image parts; and means in the medium for applying sparse matrix multiplication to each of the first and second image parts through utilization of matricies represented by $k1\cdot((T_L T^t_s)+(T_R T^t_s))$ and $k2\cdot((T_L T^t_s)-(T_R T^t_s))$, wherein superscript t denotes transpose of a matrix, k1 and k2 are scalar constants, $T_L$ and $T_R$ are N/2 leftmost and N/2 rightmost columns respectively of an N×N non-identity matrix $T=[T_L T_R]$ such that $TT^t$ is an identity matrix and $T_s$ is an N/2×N/2 non-identity matrix such that $T_s T^t_s$ is an identity matrix.

28. The article of claim 27, wherein the matrices represented by $k1\cdot((T_L T^t_s)+(T_R T^t_s))$ and $k2\cdot((T_L T^t_s)-(T_R T^t_s))$ each include a majority of entries with a value of zero.

29. The article of claim 27, wherein the means in the medium for receiving the first and second image parts comprises means in the medium for receiving a plurality of image parts that comprise an initial size; and wherein the means in the medium for applying sparse matrix multiplication to each of the first and second image parts comprises means in the medium for applying sparse matrix multiplication to each image part of the plurality of image parts to obtain a resultant plurality of image parts that comprise a resultant size different from the initial size.

30. The article of claim 29, wherein the means in the medium for applying sparse matrix multiplication to each image part of the plurality of image parts comprises means in the medium for selecting the resultant size and the initial size to comprise a ratio therebetween that includes a factor of two.

31. The article of claim 27, wherein the matrix T is one of a discrete cosine transform (DCT) matrix, a discrete sine transform matrix, a Fourier transform matrix, or a Hadamard transform matrix of size N×N, and the matrix $T_s$ is the corresponding transform matrix of size N/2×N/2.

32. The article of claim 27, wherein the means in the medium for receiving the first and second image parts comprises means in the medium for receiving a first plurality of image parts, wherein the means in the medium for applying sparse matrix multiplication to each of the first and second image parts comprises means in the medium for applying sparse matrix multiplication to each image part of the first plurality of image parts to obtain a second plurality of image parts, and further comprising means in the medium for applying sparse matrix multiplication to each image part of the second plurality of image parts.

33. The article of claim 32, wherein the means in the medium for applying sparse matrix multiplication to each image part of the second plurality of image parts comprises means in the medium for applying sparse matrix multiplication to each image part of the second plurality of image parts to obtain a third plurality of image parts, and further comprising means in the medium for applying simple linear processing to the third plurality of image parts to obtain low-frequency image parts in a transform domain.

34. The article of claim 33, wherein the means in the medium for receiving the first and second image parts comprises means in the medium for receiving a plurality of image parts that comprise an initial image length and an initial image height; and wherein the means in the medium for applying sparse matrix multiplication to each of the first and second image parts comprises means in the medium for applying sparse matrix multiplication to each image part of the plurality of image parts to obtain a resultant plurality of image parts that comprise a resultant image length and a resultant image height, wherein the resultant image length and the initial image length comprise a ratio therebetween that includes a factor of two, wherein the resultant image height and the initial image height comprise a ratio therebetween that includes a factor of two.

35. The article of claim 27, wherein the means in the medium for receiving the first and second image parts comprises:

means in the medium for receiving a first plurality of image parts in a transform domain that each comprise a low-frequency portion; and means in the medium for applying simple linear processing to the low-frequency portion of each image part of the first plurality of image parts to obtain a second plurality of image parts;

wherein the means in the medium for applying sparse matrix multiplication to each of the first and second image parts comprises means in the medium for applying sparse matrix multiplication to each image part of the second plurality of image parts to obtain a third plurality of image parts, and further comprising means in the medium for applying simple linear processing to each image part of the third plurality of image parts to obtain a resultant image in the transform domain.

36. The article of claim 35, wherein the means in the medium for receiving the first and second image parts comprises means in the medium for receiving a plurality of image parts that comprise an initial image length and an initial image height; and wherein the means in the medium for applying sparse matrix multiplication to each of the first and second image parts comprises means in the medium for applying sparse matrix multiplication to each image part of the plurality of image parts to obtain a resultant plurality of image parts that comprise a resultant image length and a resultant image height, wherein the initial image length and the resultant image length comprise a ratio therebetween that includes a factor of two, wherein the initial image height and the resultant image height comprise a ratio therebetween that includes a factor of two.

37. The article of claim 27, wherein k1 and k2 each equal $$\frac{1}{\sqrt{2} \cdot 2}.$$

38. The article of claim 27, wherein k1 and k2 each equal $$\frac{\sqrt{2}}{2}.$$

39. An article, comprising:

a computer-readable signal-bearing medium;

means in the medium for receiving first and second image parts through receipt of a first plurality of image parts;

means in the medium for applying sparse matrix multiplication to each of the first and second image parts which comprises means in the medium for applying sparse matrix multiplication to each image part of the first plurality of image parts to obtain a second plurality of image parts;

means in the medium for applying sparse matrix multiplication to each image part of the second plurality of image parts to obtain a third plurality of image parts; and means in the medium for applying simple linear processing to the third plurality of image parts to obtain low-frequency image parts in a transform domain and for obtaining a value of zero for high-frequency image parts in the transform domain.

* * * * *